United States Patent
Tsuge

(10) Patent No.: US 10,234,748 B2
(45) Date of Patent: Mar. 19, 2019

(54) IMAGING DEVICE WITH INTERCHANGEABLE LENS AND DISPLAY DEVICE

(71) Applicant: SONY CORPORATION, Tokyo (JP)

(72) Inventor: Takahiro Tsuge, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/306,924

(22) PCT Filed: Apr. 30, 2015

(86) PCT No.: PCT/JP2015/002302
§ 371 (c)(1),
(2) Date: Oct. 26, 2016

(87) PCT Pub. No.: WO2015/170468
PCT Pub. Date: Nov. 12, 2015

(65) Prior Publication Data
US 2017/0045806 A1    Feb. 16, 2017

(30) Foreign Application Priority Data

May 8, 2014  (JP) ................... 2014-097125

(51) Int. Cl.
| H04N 5/225 | (2006.01) |
|---|---|
| G03B 17/38 | (2006.01) |
| G03B 17/02 | (2006.01) |
| G03B 15/05 | (2006.01) |
| G03B 17/14 | (2006.01) |
| G06F 3/0484 | (2013.01) |
| G06F 3/16 | (2006.01) |
| H04N 5/232 | (2006.01) |

(52) U.S. Cl.
CPC ............. *G03B 17/38* (2013.01); *G03B 15/05* (2013.01); *G03B 17/02* (2013.01); *G03B 17/14* (2013.01);
(Continued)

(58) Field of Classification Search
CPC .............................. H04N 5/2252; G03B 17/38
(Continued)

(56) References Cited

U.S. PATENT DOCUMENTS

| 2002/0001467 A1* | 1/2002 | Tanaka ................. G02B 7/102 396/177 |
|---|---|---|
| 2006/0291842 A1* | 12/2006 | Tokiwa ................. G03B 17/14 396/56 |

(Continued)

FOREIGN PATENT DOCUMENTS

| JP | 11-223859 A | 8/1999 |
|---|---|---|
| JP | 11223859 A  * | 8/1999 |

(Continued)

OTHER PUBLICATIONS

LYTRO User Manual, 2012.*

*Primary Examiner* — Usman A Khan

(74) *Attorney, Agent, or Firm* — Chip Law Group

(57) ABSTRACT

There is provided an imaging device including an image sensor, and an outer case in which the image sensor is disposed. A shooting button configured to photograph a subject is disposed on an outer peripheral surface of the outer case. When an intersection line between a horizontal surface including a center of the outer case in a vertical direction and the outer peripheral surface of the outer case is set as a horizontal line, the shooting button is positioned close to the horizontal line above the horizontal line. A zoom knob configured to change photographic magnification is positioned on a same side as the shooting button in a horizontal direction.

20 Claims, 22 Drawing Sheets

(52) U.S. Cl.
CPC ............ *G06F 3/04847* (2013.01); *G06F 3/16* (2013.01); *H04N 5/2252* (2013.01); *H04N 5/2253* (2013.01); *H04N 5/2254* (2013.01); *H04N 5/2256* (2013.01); *H04N 5/23293* (2013.01)

(58) Field of Classification Search
USPC .......................................................... 348/373
See application file for complete search history.

(56) References Cited

U.S. PATENT DOCUMENTS

| | | | |
|---|---|---|---|
| 2007/0058972 A1 | 3/2007 | Misawa | |
| 2009/0168353 A1* | 7/2009 | Kato | H04N 5/2252 |
| | | | 361/697 |
| 2013/0236166 A1* | 9/2013 | Enomoto | G03B 17/08 |
| | | | 396/25 |

FOREIGN PATENT DOCUMENTS

| | | | |
|---|---|---|---|
| JP | HEI 11-223859 A | | 8/1999 |
| JP | 2000-224449 A | | 8/2000 |
| JP | 2001-297655 A | | 10/2001 |
| JP | 2001297655 A | * | 10/2001 |
| JP | 2007-171806 A | | 7/2007 |
| JP | 2007-279486 A | | 10/2007 |
| JP | 2008-193457 A | | 8/2008 |
| JP | 2009-105919 A | | 5/2009 |
| JP | 2012-124626 A | | 6/2012 |
| JP | 2013-092556 A | | 5/2013 |

* cited by examiner

[Fig. 1]
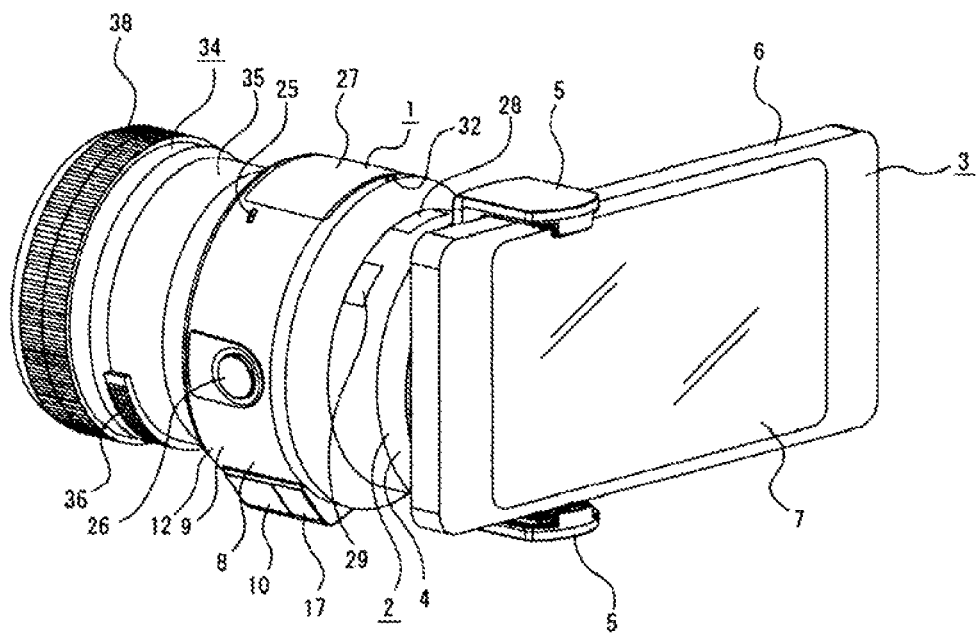

[Fig. 2]
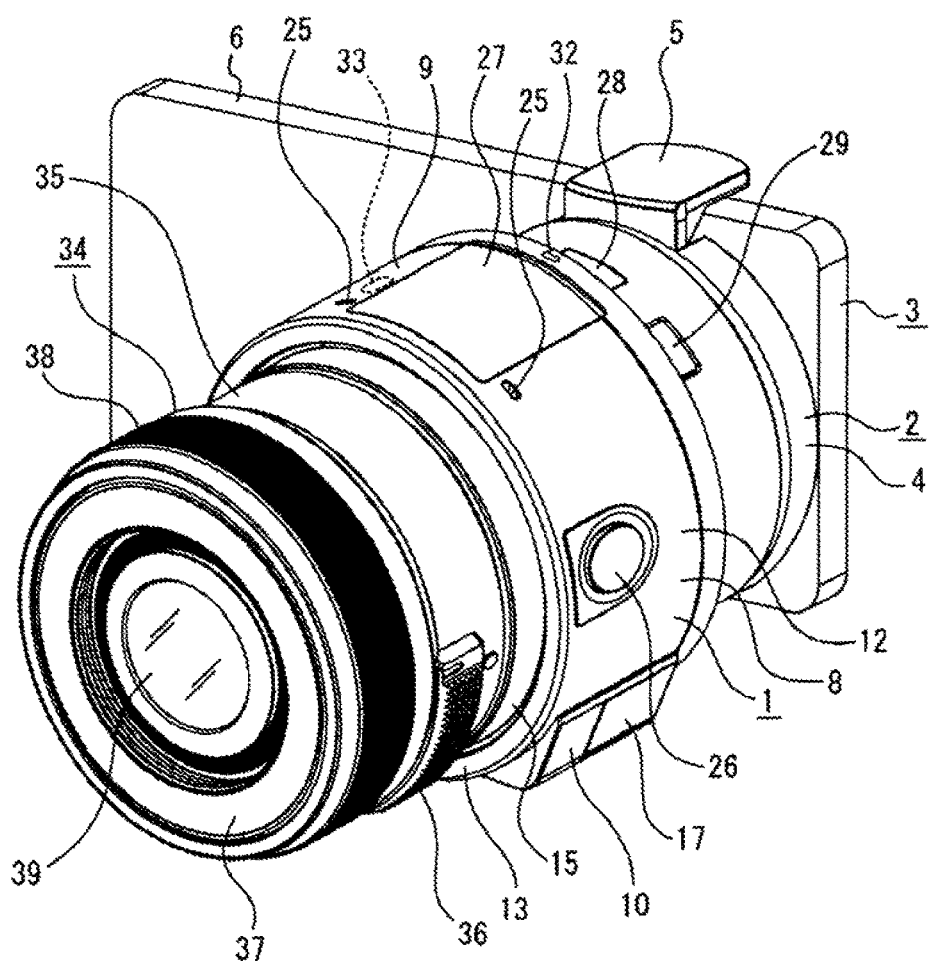

[Fig. 3]
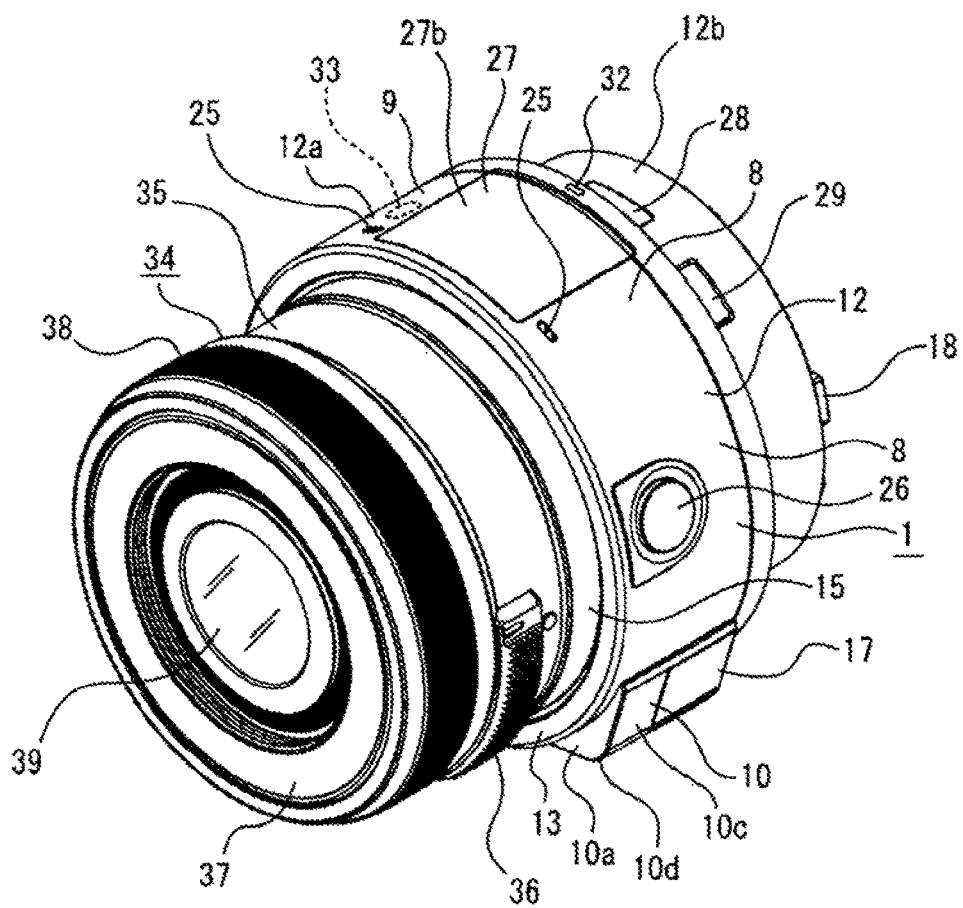

[Fig. 4]
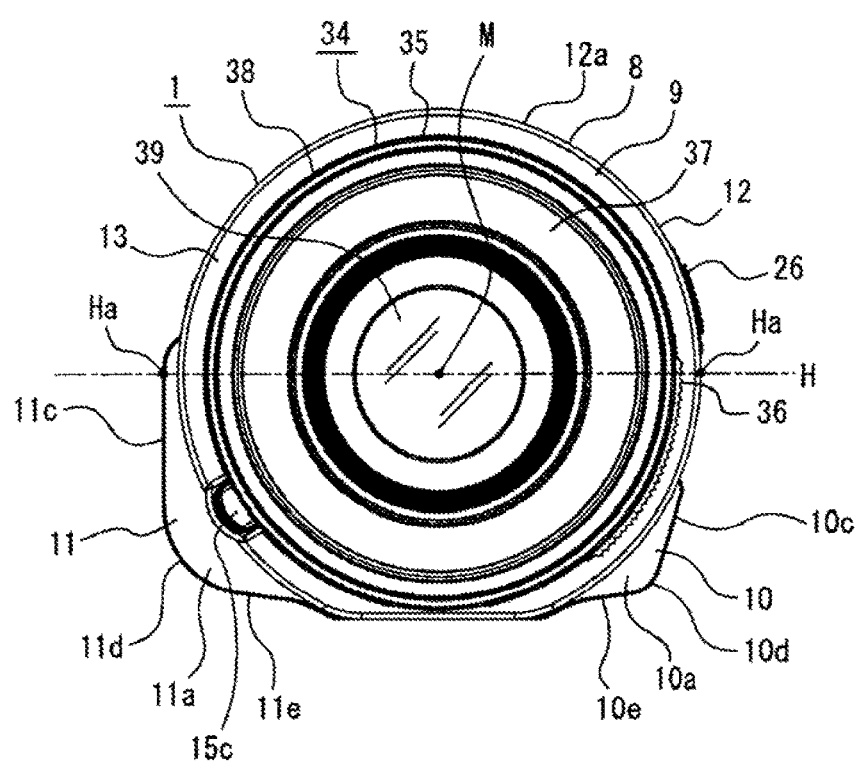

[Fig. 5]
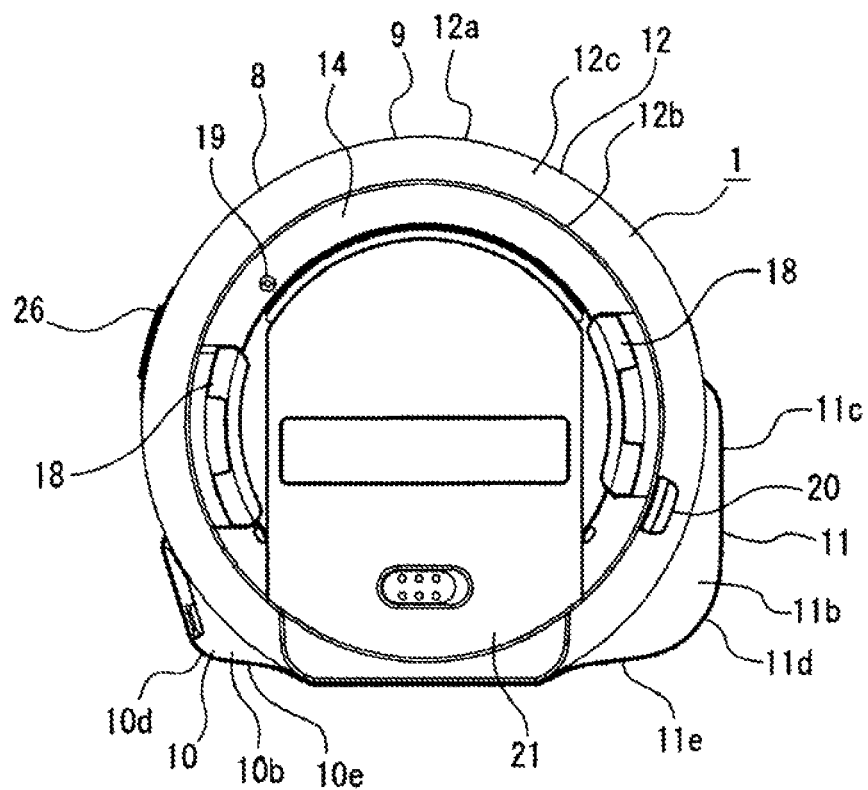

[Fig. 6]
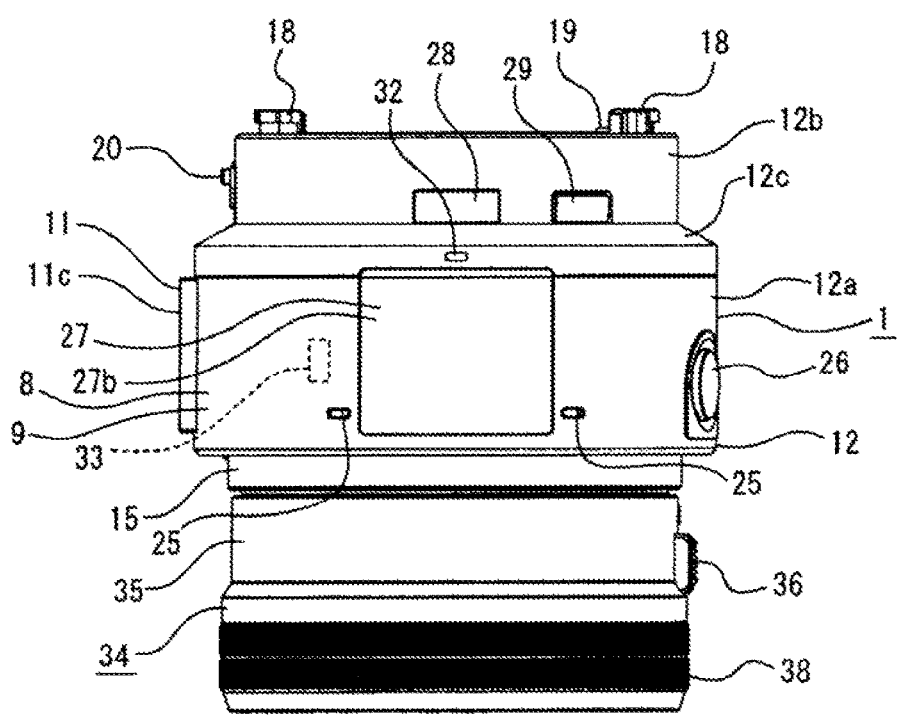

[Fig. 7]
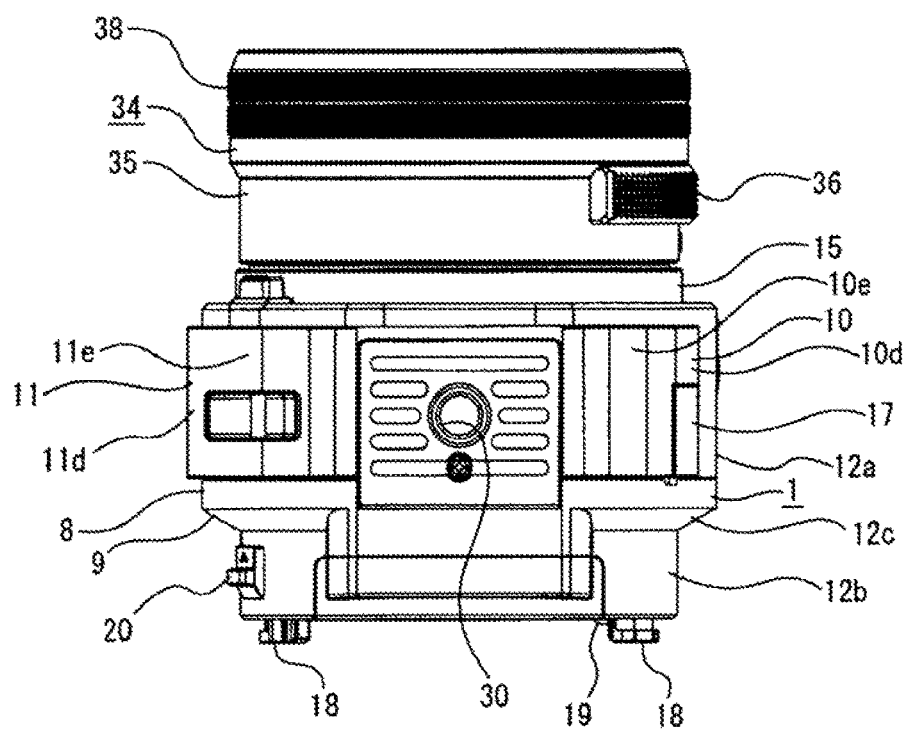

[Fig. 8]
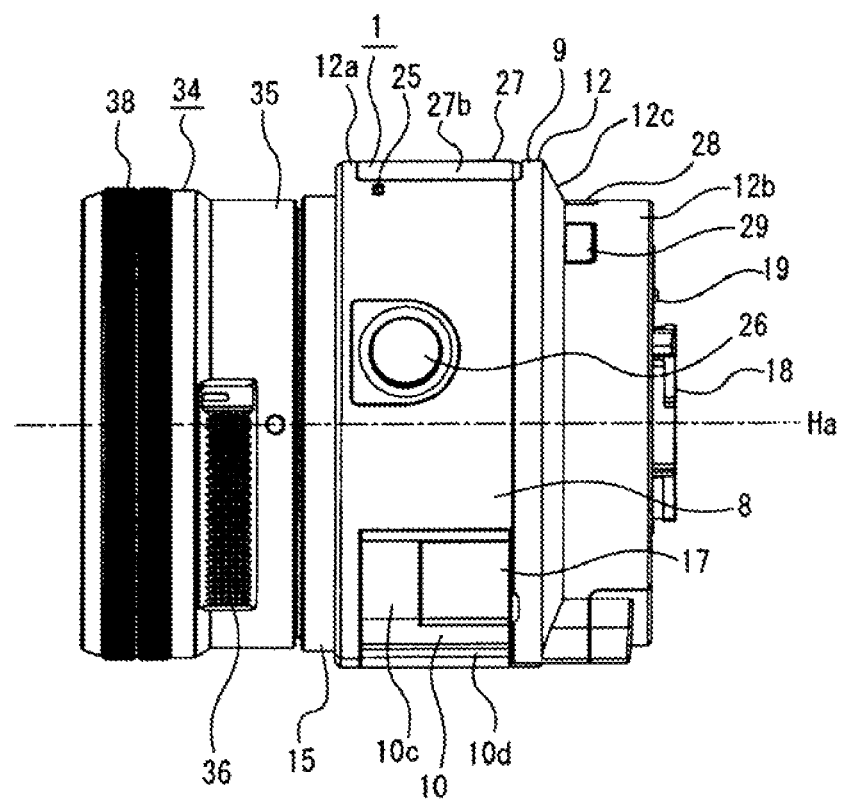

[Fig. 9]
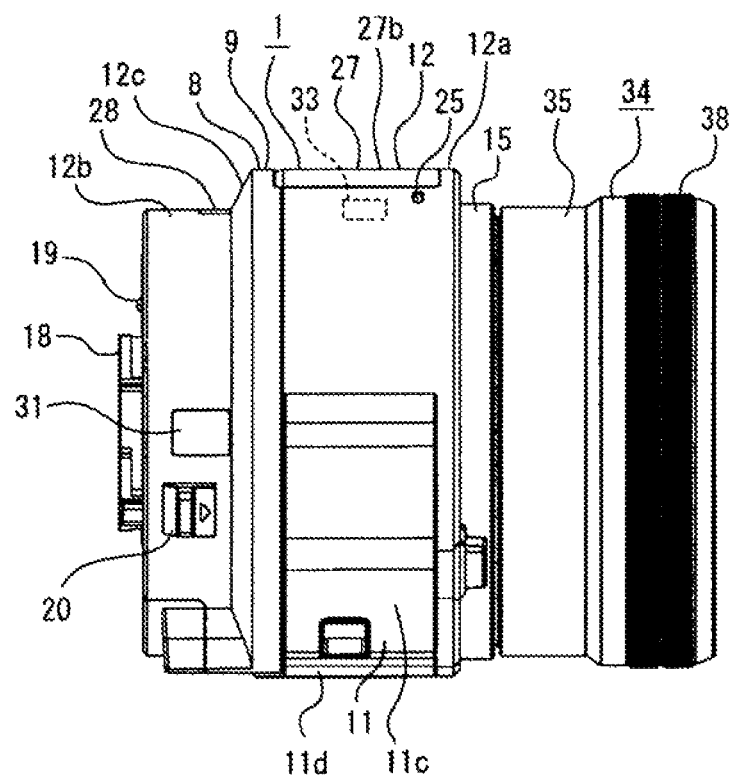

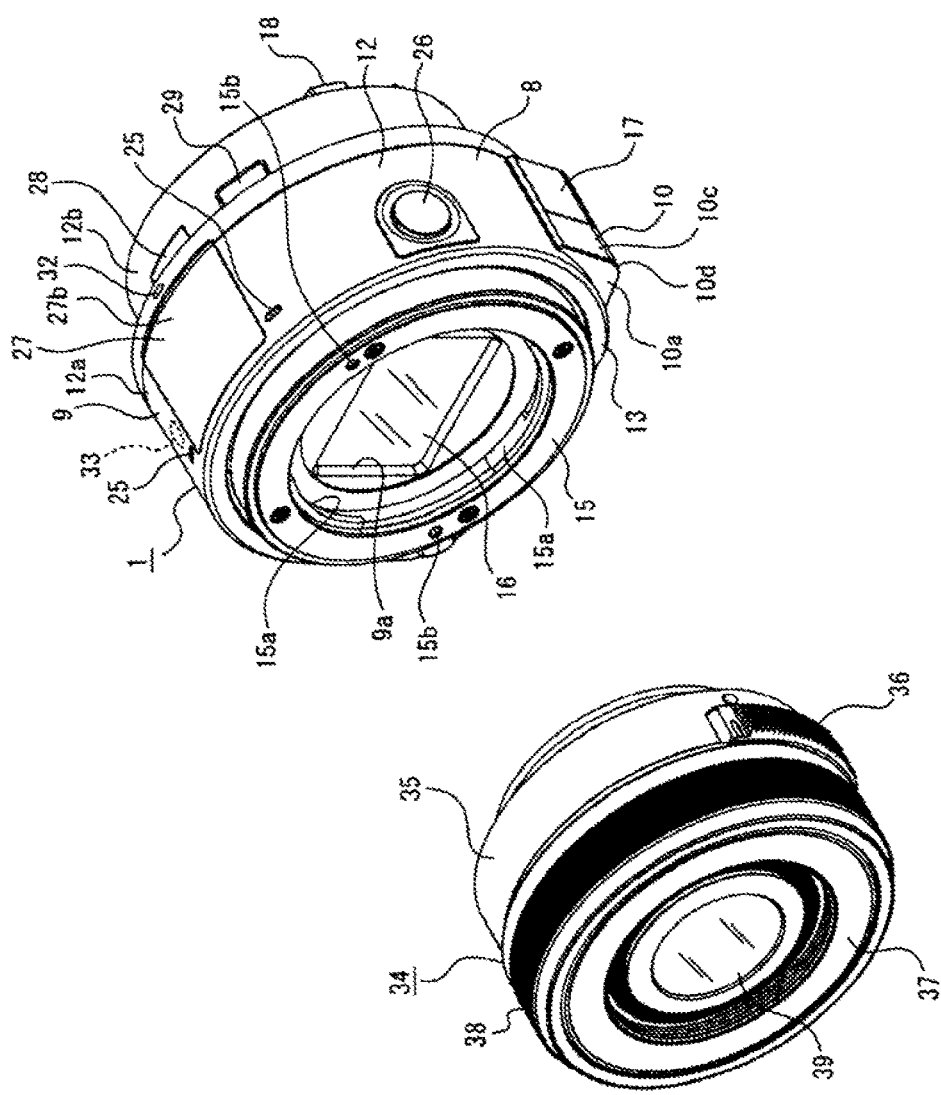
[Fig. 10]

[Fig. 11]
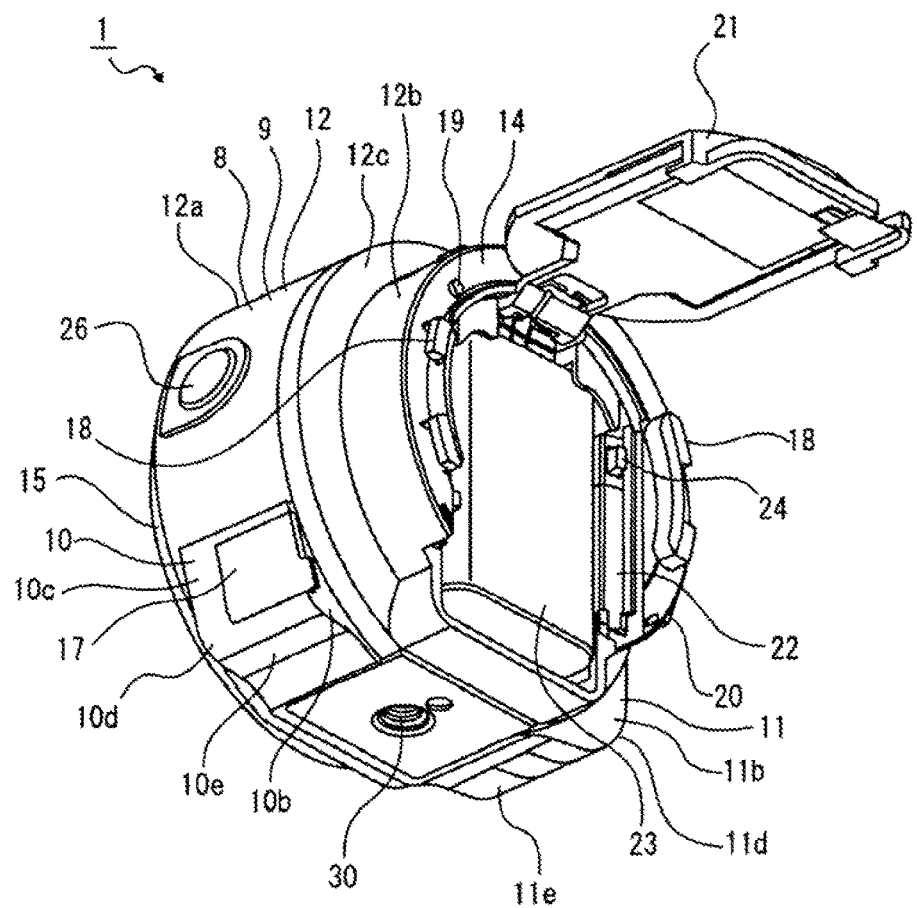

[Fig. 12]
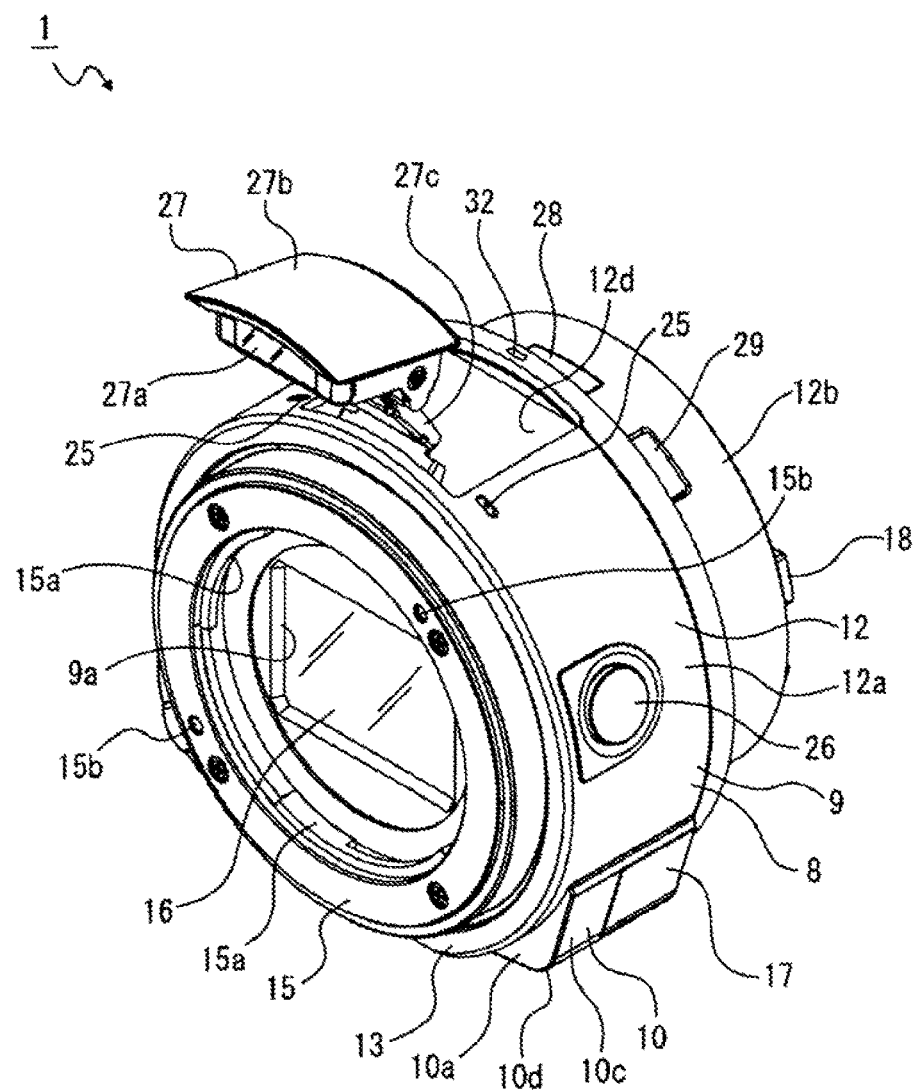

[Fig. 13]
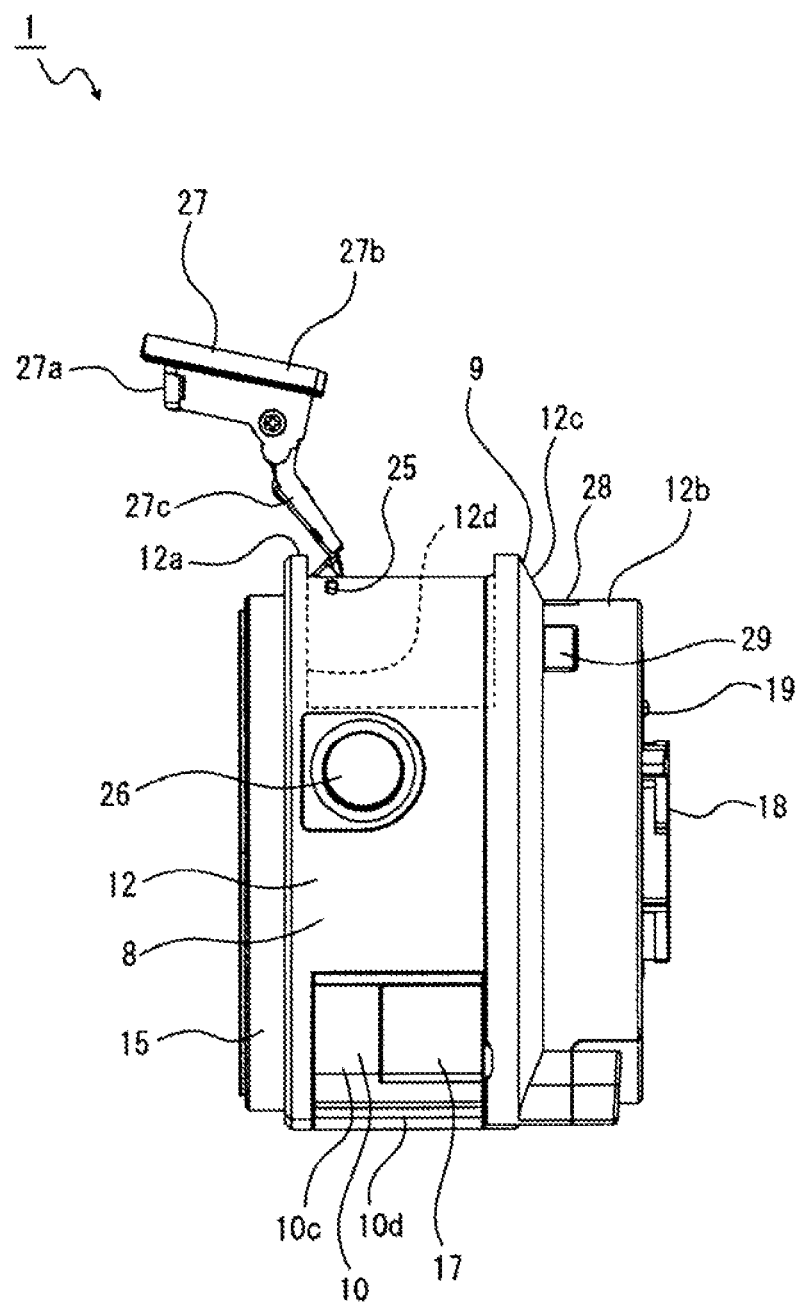

[Fig. 14]
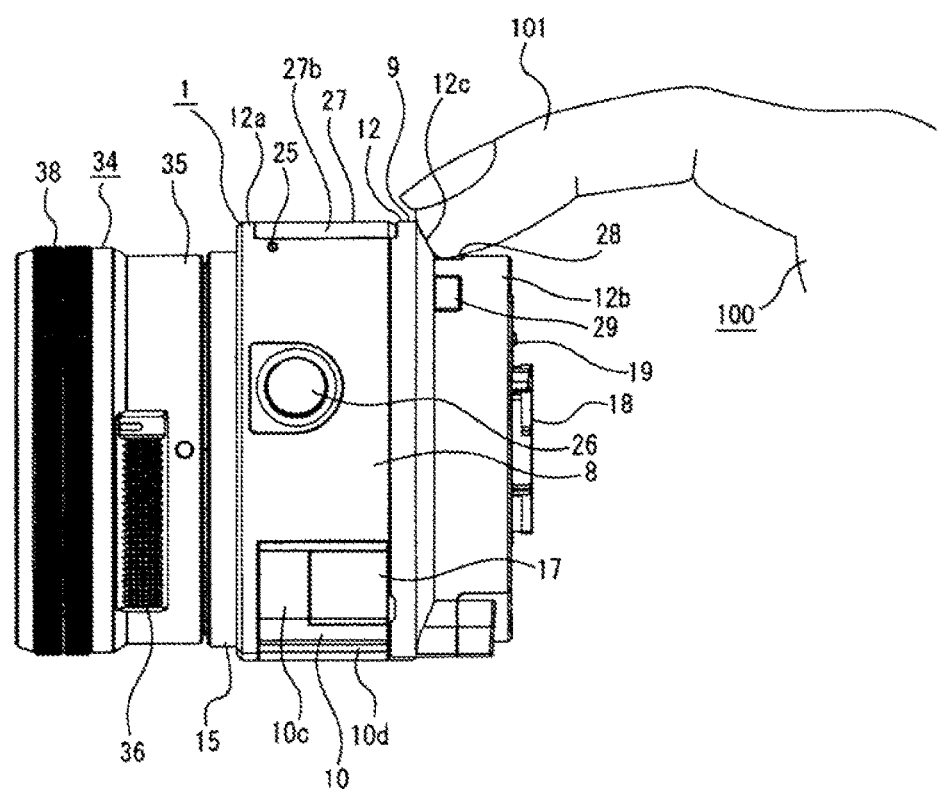

[Fig. 15]
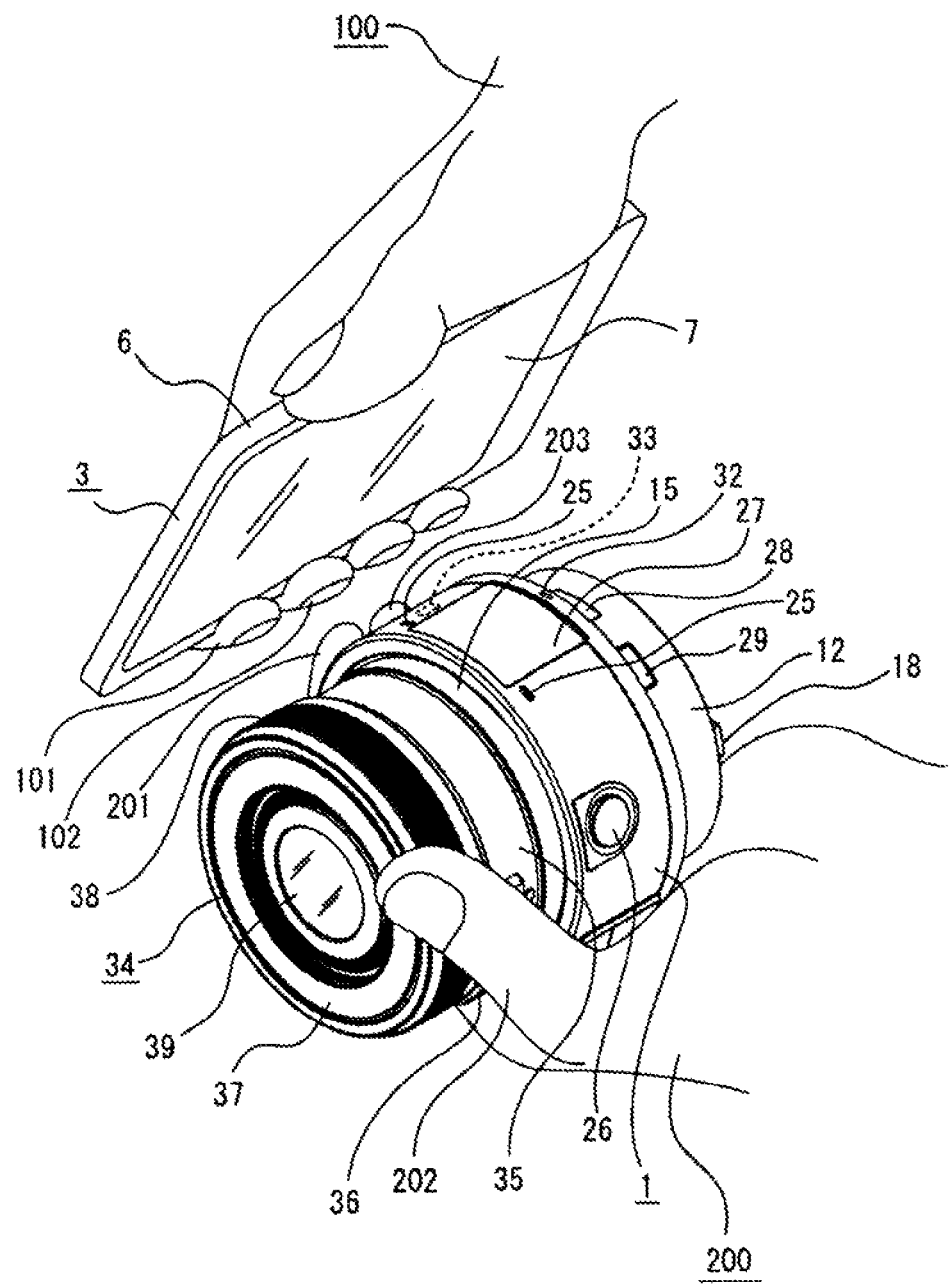

[Fig. 16]
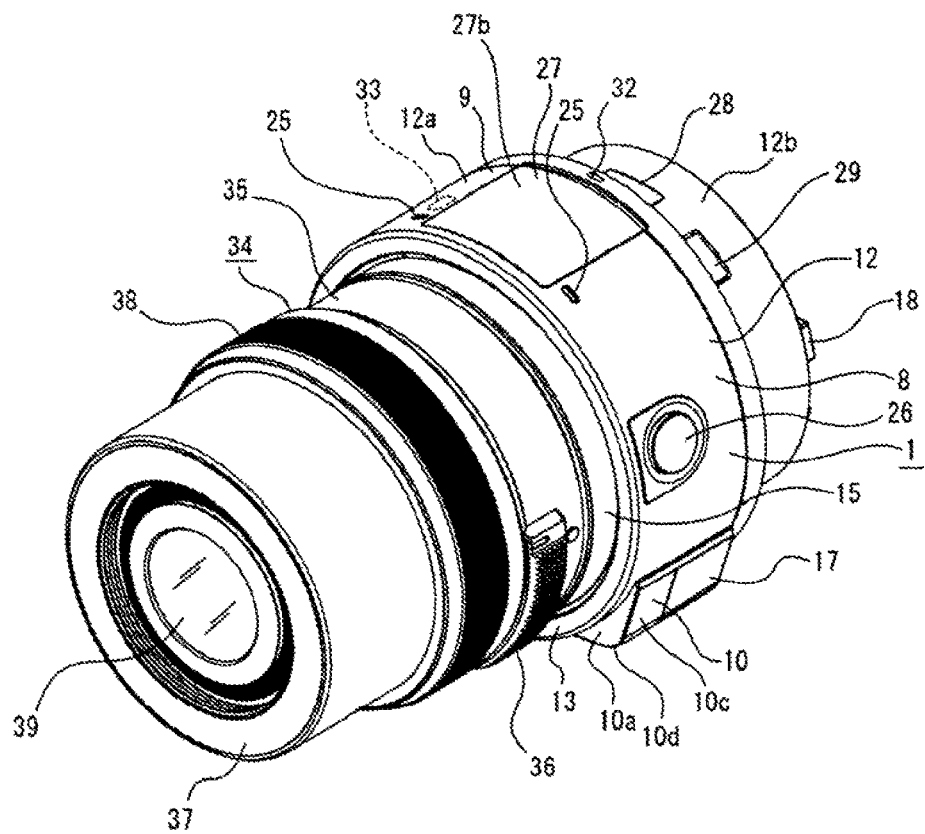

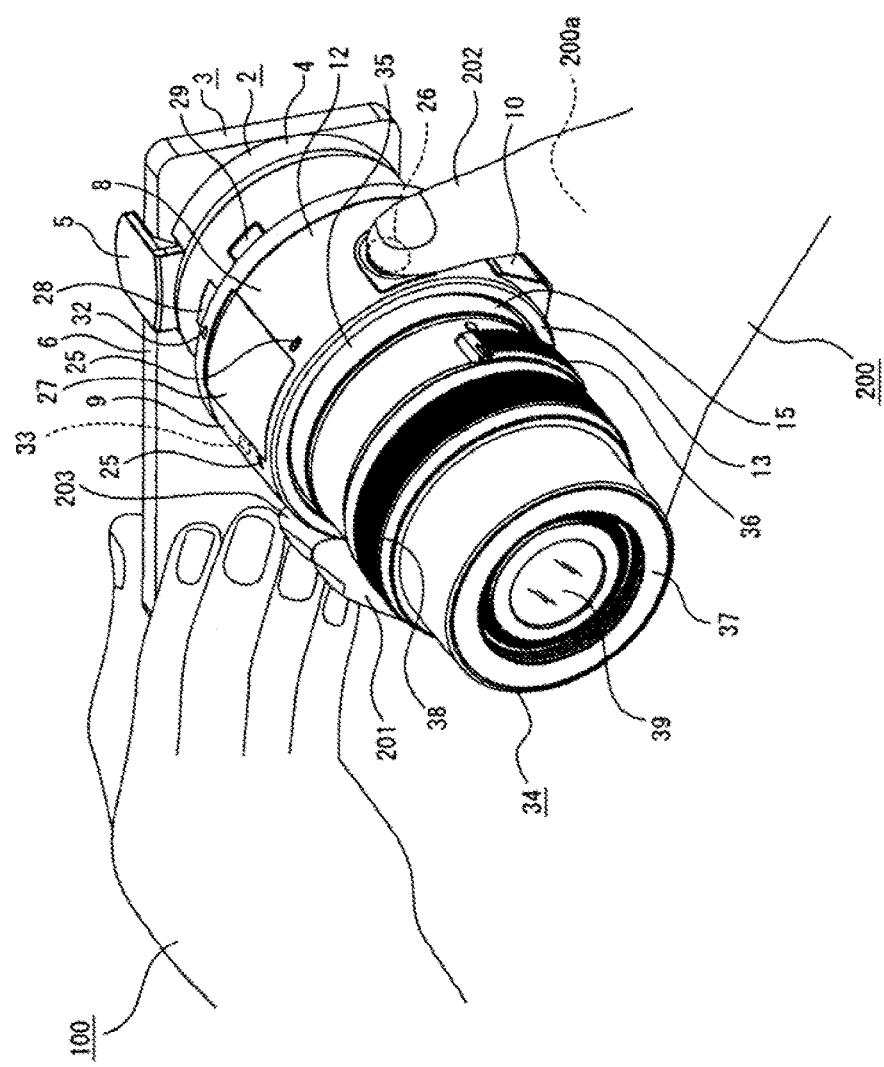
[Fig. 17]

[Fig. 18]
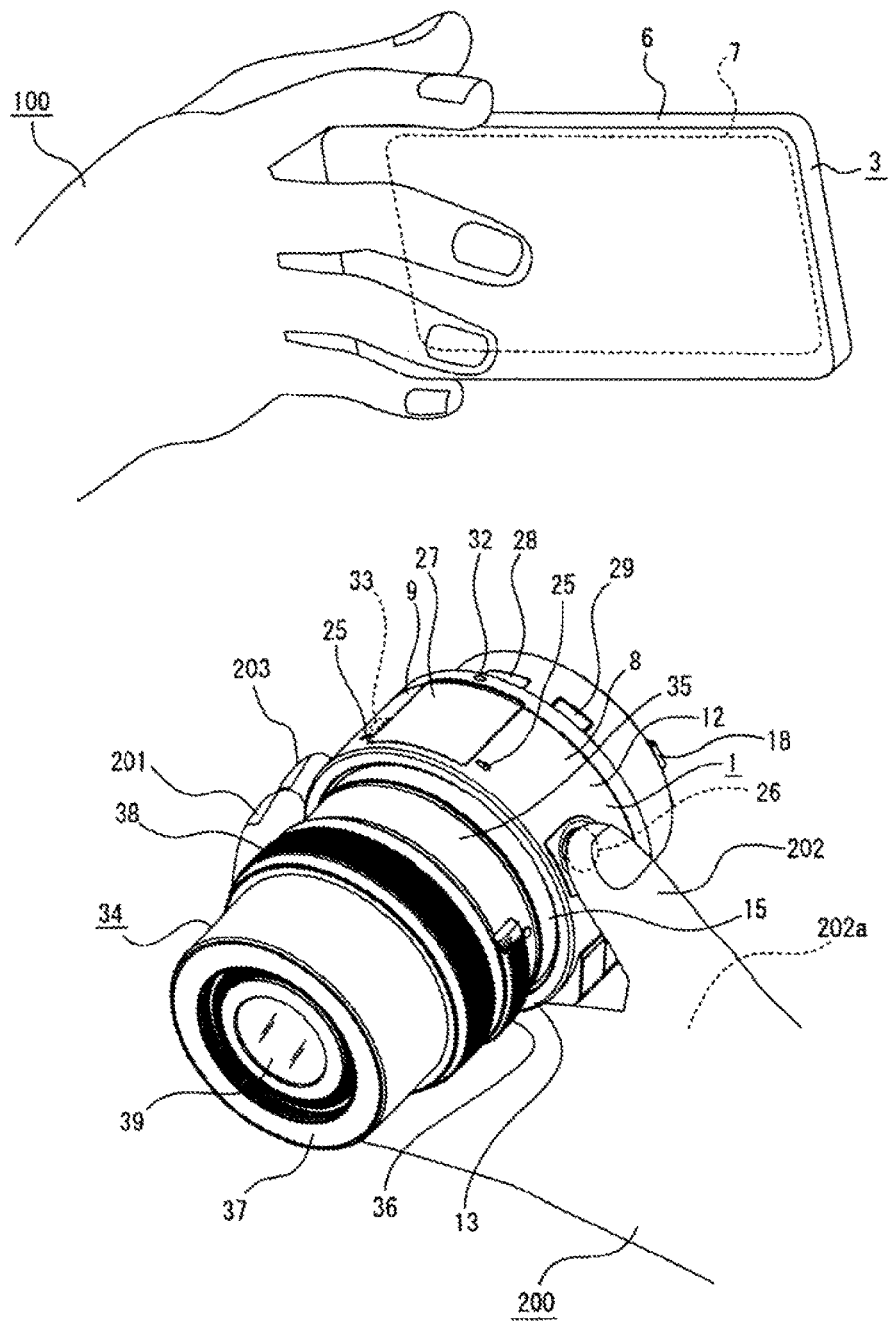

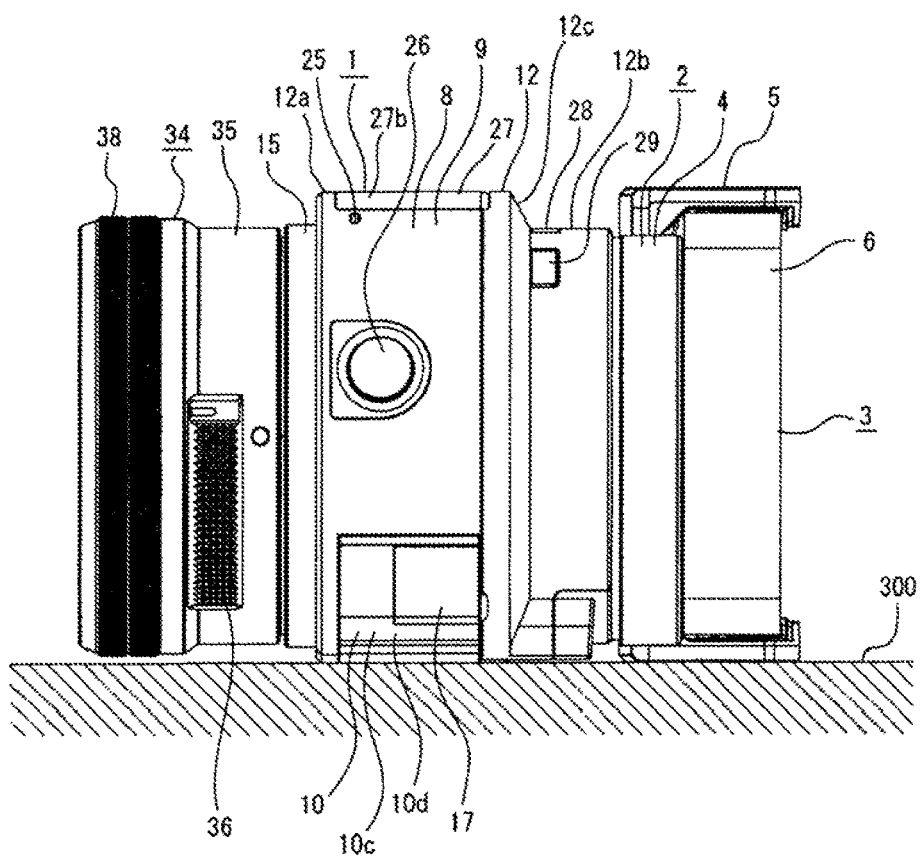
[Fig. 19]

[Fig. 20]
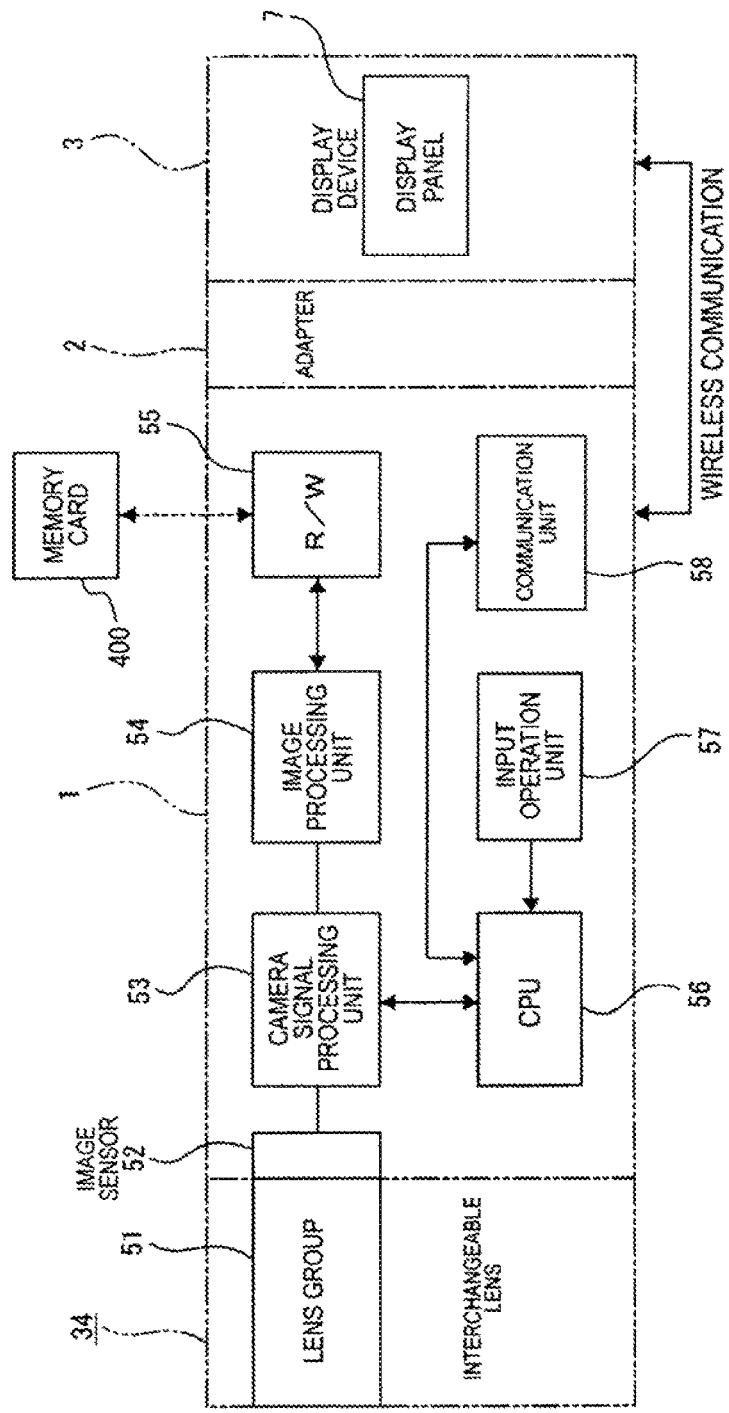

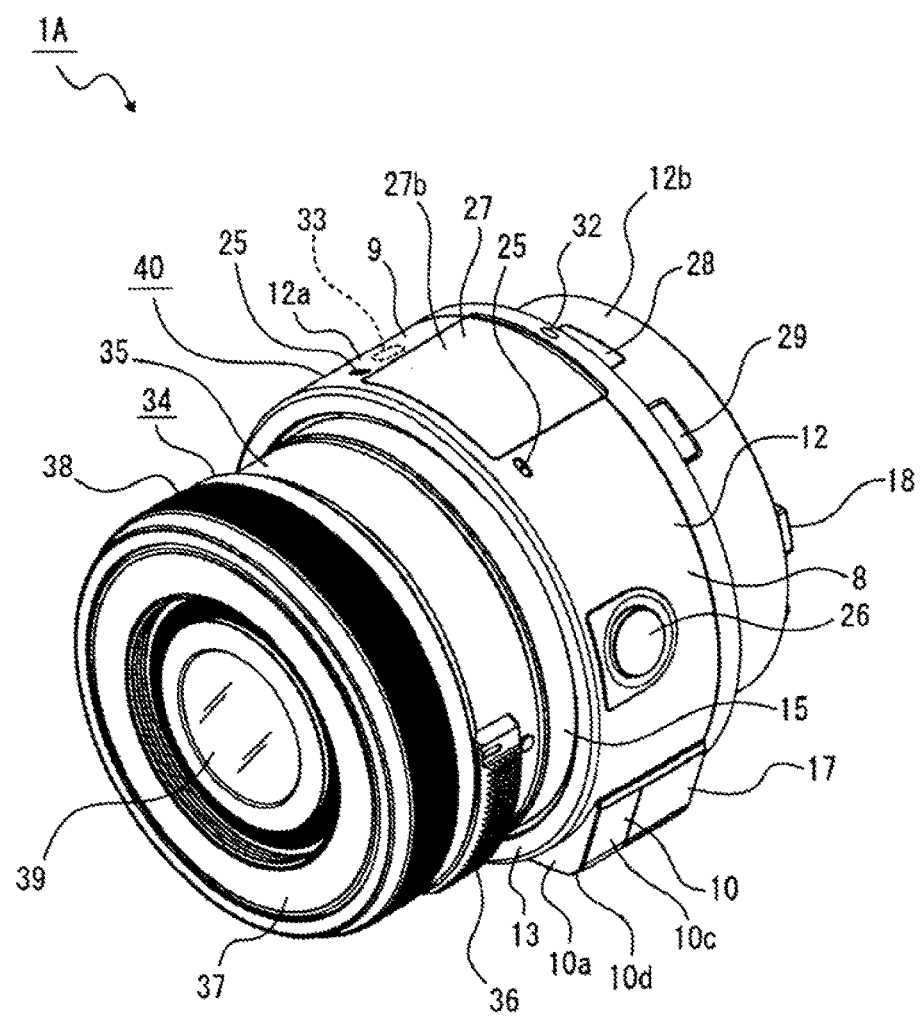
[Fig. 21]

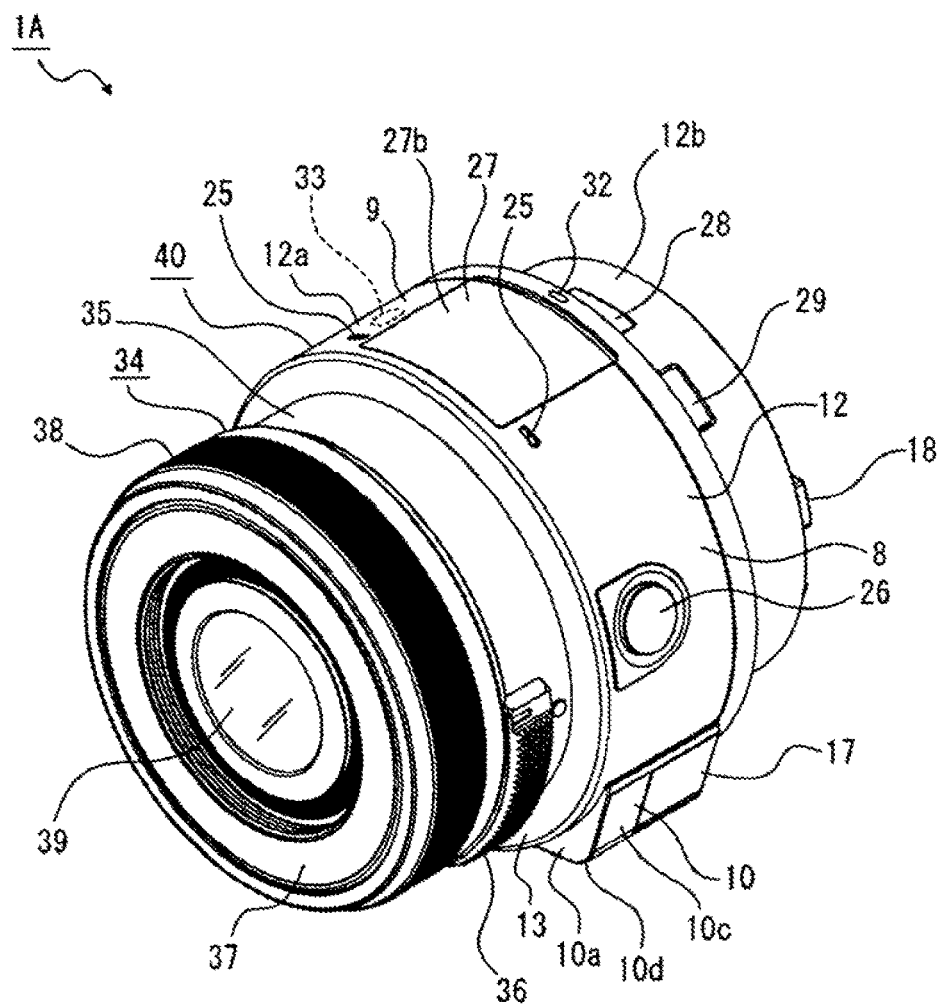
[Fig. 22]

IMAGING DEVICE WITH INTERCHANGEABLE LENS AND DISPLAY DEVICE

CROSS REFERENCE TO RELATED APPLICATIONS

This application is a U.S. National Phase of International Patent Application No. PCT/JP2015/002302 filed on Apr. 30, 2015, which claims priority benefit of Japanese Patent Application No. JP 2014-097125 filed in the Japan Patent Office on May 8, 2014. Each of the above-referenced applications is hereby incorporated herein by reference in its entirety.

TECHNICAL FIELD

The present technology relates to a technical field of an imaging device in which a shooting button is disposed on an outer peripheral surface of an outer case in which an image sensor is disposed.

CITATION LIST

Patent Literature

[PTL 1] JP 2013-92556A

BACKGROUND ART

There are devices having different functions, one device of which is detachably attached to the other device. As such devices of which one device is detachably attached to the other device, for example, there are an interchangeable lens having a zoom function and a device body having an imaging function.

Also, there are devices having different functions, one device of which is detachably attached to the other device through an adapter. As such an example, an interchangeable lens is detachably attachable to a device body through an adapter (see, for example, PTL 1).

As a method of attaching an adapter to a device body, PTL 1 describes a method of engaging an engagement unit of the adapter with an engagement unit of the device body by rotating the entire adapter with respect to the device body.

On the other hand, in recent years, with the advance of communication technologies such as a wireless local area network (LAN), for example, development such as displaying an image acquired by an imaging device on a display panel (display) of a display device is progressing.

SUMMARY

Technical Problem

By the way, in the imaging device that can perform an imaging operation in conjunction with the display device, it is desirable to improve usability ensuring good operability during use.

Therefore, the imaging device according to embodiments of the present technology is directed to improve usability.

Solution to Problem

First, accord ing to an embodiment of the present disclosure, there is provided an imaging device including an image sensor, and an outer case in which the image sensor is disposed. A shooting button configured to photograph a subject is disposed on an outer peripheral surface of the outer case. When an intersection line between a horizontal surface including a center of the outer case in a vertical direction and the outer peripheral surface of the outer case is set as a horizontal line, the shooting button is positioned close to the horizontal line above the horizontal line. A zoom knob configured to change photographic magnification is positioned on a same side as the shooting button in a horizontal direction.

Therefore, a subject is photographed by operating the shooting button positioned close to the horizontal line above the horizontal line.

Second, with regard to the imaging device according to an embodiment of the present disclosure, a large-diameter portion and a small-diameter portion having a smaller outer diameter than an outer diameter of the large-diameter portion may preferably be provided in the outer case, the large-diameter portion and the small-diameter portion being spaced apart or continuous in an optical axis direction of light incident on the image sensor. The large-diameter portion may preferably be provided closer to a subject side than the small-diameter portion.

Therefore, the diameter of the subject side of the outer case is increased and the user easily grasps the imaging device.

Third, with regard to the imaging device according to an embodiment of the present disclosure, a power button configured to perform power on and off may preferably be disposed in the small-diameter portion.

Therefore, the power button is hardly operated erroneously.

Fourth, with regard to the imaging device according to an embodiment of the present disclosure, an inclined portion may preferably be provided between the large-diameter portion and the small-diameter portion, the inclined portion being inclined in a manner that the inclined portion has a smaller diameter from the large-diameter portion to the small-diameter portion. The power button may preferably be disposed at an end part of an inclined portion side in the small-diameter portion.

Therefore, the power button can be operated by putting the finger on the inclined portion and sliding the finger from the inclined portion to the small-diameter portion.

Fifth, with regard to the imaging device according to an embodiment of the present disclosure, a flash unit which includes a flash configured to emit auxiliary light may preferably be provided, the flash unit being moved between an accommodation position where the flash unit is accommodated inside the outer case and a protrusion position where the flash unit protrudes outward from the outer case. In addition, a pop-up button may preferably be provided in the small-diameter portion so as to move the flash unit from the accommodation position to the protrusion position.

Therefore, the pop-up button is hardly operated erroneously.

Sixth, with regard to the imaging device according to an embodiment of the present disclosure, an inclined portion may preferably be provided between the large-diameter portion and the small-diameter portion, the inclined portion being inclined in a manner that the inclined portion has a smaller diameter from the large-diameter portion to the small-diameter portion. In addition, the pop-up button may preferably be disposed at an end part of an inclined portion side in the small-diameter portion.

Therefore, the pop-up button can be operated by putting the finger on the inclined portion and sliding the finger from the inclined portion to the small-diameter portion.

Seventh, with regard to the imaging device according to an embodiment of the present disclosure, the flash may preferably be accommodated in the large-diameter portion. In addition, the large-diameter portion may preferably be provided closer to a subject side than the small-diameter portion.

Therefore, the auxiliary light emitted from the flash hardly arrives at the large-diameter portion.

Eighth, with regard to the imaging device according to an embodiment of the present disclosure, a battery accommodation portion configured to accommodate a battery may preferably be provided inside the outer case. In addition, a battery cover configured to open and close the battery accommodation portion may preferably be supported by the outer case. In addition, an operation button may preferably be disposed in the battery accommodation portion.

Therefore, the operation button is not operated at the time of closing the battery cover.

Ninth, with regard to the imaging device according to an embodiment of the present disclosure, a communication switch button configured to switch a communication state with another device may preferably be provided as the operation button.

Therefore, the operation button that is less frequently used is disposed in the battery accommodation portion.

Tenth, with regard to the imaging device according to an embodiment of the present disclosure, a microphone may preferably be disposed in the large-diameter portion.

Therefore, the microphone is positioned in the outermost periphery of the imaging device and external sound is hardly blocked.

Eleventh, with regard to the imaging device according to an embodiment of the present disclosure, a cylindrical housing portion which includes the large-diameter portion and the small-diameter portion, and a rolling prevention portion which protrudes outside the cylindrical housing portion in a direction perpendicular to an optical axis direction may preferably be provided in the outer case. The rolling prevention portion may preferably be provided on a lower surface side of the cylindrical housing portion. The shooting button may preferably be positioned on an upper side above the rolling prevention portion.

Therefore, photographing can be performed by operating the shooting button with the hand grasping the rolling prevention portion during photographing.

Twelfth, with regard to the imaging device according to an embodiment of the present disclosure, the two rolling prevention portions may preferably be spaced apart horizontally and provided.

Therefore, the photographing can be performed while grasping either a first rolling prevention portion or a second rolling prevention portion.

Thirteenth, with regard to the imaging device according to an embodiment of the present disclosure, a first rolling prevention portion and a second rolling prevention portion having a larger outer shape than an outer shape of the first rolling prevention portion may preferably be provided as the two rolling prevention portions. The shooting button may preferably be provided closer to the first rolling prevention portion than the second rolling prevention portion.

Therefore, due to the first rolling prevention portion, the movement of the finger for operating the operation button is hardly disturbed.

Fourteenth, with regard to the imaging device according to an embodiment of the present disclosure, a light-emitting display unit configured to exhibit a display function by light emission may preferably be disposed in the large-diameter portion.

Therefore, the light emitted from the light-emitting display unit is not shielded.

Fifteenth, with regard to the imaging device according to an embodiment of the present disclosure, an interchangeable lens including a photographic lens may preferably be detachable.

Therefore, photographic magnification can be changed by attaching the interchangeable lens.

Sixteenth, with regard to the imaging device according to an embodiment of the present disclosure, an interchangeable lens including a photographic lens may preferably be integrally provided.

Therefore, it is unnecessary to detach and attach the interchangeable lens.

Seventeenth, according to another embodiment of the present disclosure, there is provided an imaging device including an interchangeable lens which includes a photographic lens and in which a zoom knob configured to change photographic magnification is disposed on an outer peripheral surface, and a device body which includes an image sensor and an outer case in which the image sensor is disposed. A shooting button configured to photograph a subject is disposed on the outer peripheral surface of the outer case. When an intersection line between a horizontal surface including a center of the outer case in a vertical direction and the outer peripheral surface of the outer case is set as a horizontal line, the shooting button is positioned close to the horizontal line above the horizontal line. The zoom knob is positioned on a same side as the shooting button in a horizontal direction.

Therefore, a subject is photographed by operating the shooting button positioned close to the horizontal line above the horizontal line.

Eighteenth, with regard to the imaging device according to an embodiment of the present disclosure, the interchangeable lens may preferably be detachably attached to the device body.

Therefore, the photographic magnification can be changed by attaching the interchangeable lens.

Nineteenth, with regard to the imaging device according to an embodiment of the present disclosure, the interchangeable lens and the device body may preferably be integrally provided.

Therefore, it is unnecessary to detach and attach the interchangeable lens.

Twentieth, with regard to the imaging device according to an embodiment of the present disclosure, a zoom knob may preferably be disposed on the interchangeable lens. The zoom knob may preferably be operated by vertical movement.

Therefore, since the finger easily moves in a vertical direction in a state of grasping the imaging device, the operating direction of the zoom knob and the easily moving direction of the finger are matched with each other.

Advantageous Effects of Invention

According to the embodiments of the present disclosure, the photographing of the subject is performed by operating the shooting button positioned close to the horizontal line above the horizontal line, and the shooting button and the zoom knob can be simultaneously or individually operated with the finger of the same hand. It is possible to ensure good operability with respect to the shooting button and the zoom knob and improve the usability of the imaging device.

Also, the effects described herein are only for illustrative purposes and there may be other effects.

BRIEF DESCRIPTION OF DRAWINGS

FIG. 1 shows an imaging device according to an embodiment of the present technology together with FIGS. 2 to 22 and is a perspective view showing a state in which an imaging device, to which an interchangeable lens is coupled, is attached to a display device through an adapter.

FIG. 2 is a perspective view showing a state in which the imaging device, to which the interchangeable lens is coupled, is attached to the display device through the adapter, when viewed in a direction different from a direction of FIG. 1.

FIG. 3 is a perspective view of the imaging device to which the interchangeable lens is coupled.

FIG. 4 is a front view of the imaging device to which the interchangeable lens is coupled.

FIG. 5 is a rear view of the imaging device to which the interchangeable lens is coupled.

FIG. 6 is a plan view of the imaging device to which the interchangeable lens is coupled.

FIG. 7 is a bottom view of the imaging device to which the interchangeable lens is coupled.

FIG. 8 is a side view of one side of the imaging device to which the interchangeable lens is coupled.

FIG. 9 is a side view of the other side of the imaging device to which the interchangeable lens is coupled.

FIG. 10 is an exploded perspective view of the interchangeable lens and the imaging device.

FIG. 11 is a perspective view of the imaging device in a state in which a battery cover is opened.

FIG. 12 is a perspective view of the imaging device in a state in which a flash unit is moved to a protrusion position.

FIG. 13 is a side view of the imaging device in a state in which the flash unit is moved to the protrusion position.

FIG. 14 is a side view showing a state in which a power button is operated.

FIG. 15 is a perspective view showing a state in which the display device is approached obliquely from an upper side to an NFC communication unit of the imaging device.

FIG. 16 is an enlarged perspective view of the imaging device in a state in which an inner cylinder part is drawn out forward.

FIG. 17 is a perspective view showing an example of a use mode of the imaging device.

FIG. 18 is a perspective view showing another example of a use mode of the imaging device.

FIG. 19 is a side view showing another example of a use mode of the imaging device.

FIG. 20 is a block diagram of the imaging device.

FIG. 21 is a perspective view showing an imaging device including an interchangeable lens and a device body.

FIG. 22 is a perspective view showing an imaging device in which an interchangeable lens and a device body are integrally formed.

DESCRIPTION OF EMBODIMENTS

Hereinafter, embodiments of the present technology will be described in detail with reference to the appended drawings.

Note that, in this specification and the appended drawings, structural elements that have substantially the same function and structure are denoted with the same reference numerals, and repeated explanation of these structural elements is omitted.

In the following description, it is assumed that a front-rear direction, a vertical direction, and a horizontal direction are based on a direction viewed from a photographer at the time of photographing of the imaging device. Therefore, a subject side is the front and a photographer side is the rear. Also, note that the front-rear direction, the vertical direction, and the horizontal direction described below are only for convenience of explanation and the embodiments of the present technology are not limited to these directions.

Relationship among Imaging Device, Adapter, and Display Device First, a relationship among an adapter 2 and a display device 3 that may be used together with an imaging device 1 will be briefly described (see FIGS. 1 and 2).

The adapter 2 is detachably attached to a rear surface of the imaging device 1. The adapter 2 is detachably attached to the display device 3.

The adapter 2 includes necessary components disposed inside and outside a base body 4. An external shape of the base body 4 is formed in a circular shape, so that the base body 4 is formed to have a flat shape whose thickness of a front-rear direction is thin. In the base body 4, a pair of accommodation concave portions (not shown) is formed on opposite sides, with a central portion being interposed therebetween. On the front surface side of the base body 4, a pair of coupling holes (not shown) is formed to be spaced apart in a circumferential direction. On the front surface side of the base body 4, a locked hole (not shown) opened forward is formed.

In the adapter 2, a pair of mounted bodies 5 and 5 that are rotatable with respect to the base body 4 are provided. The mounted bodies 5 and 5 are rotatable at positions of opposite sides, with the central portion of the base body 4 being interposed therebetween. The mounted bodies 5 and 5 are rotatable between an accommodation position where the mounted bodies are accommodated in the accommodation concave portion of the base body 4 and a drawn-out position where the mounted bodies are drawn out from the accommodation concave portion.

The mounted bodies 5 and 5 are movable such that one of the mounted bodies 5 and 5 is movable with respect to the other in a contacting/separating direction (vertical direction), and one of the mounted bodies 5 and 5 is biased in a direction of approaching the other by a spring (not shown).

The mounted bodies 5 and 5 are mounted on the display device 3 such that the display device 3 is interposed between the mounted bodies 5 and 5 in a vertical direction in a state in which the mounted bodies 5 and 5 are rotated to the drawn-out position. At this time, since one of the mounted bodies 5 and 5 is biased in a direction of approaching the other, the stable mounting state of the adapter 2 with respect to the display device 3 is ensured, with the display device 3 being interposed therebetween in the vertical direction.

The display device 3 is, for example, a mobile phone. However, the display device 3 is not limited to the mobile phone, and the display device 3 may be any device as long as the device has a display function. For example, the display device 3 may be a mobile terminal, a television system, or the like.

The display device 3 includes necessary components disposed inside and outside a housing 6. The housing 6, for example, is formed to have a substantially rectangular case shape, and a display panel 7 is provided on one surface (rear surface) of the housing 6. The display panel 7 executes a predetermined function by performing a contact operation on each predetermined position of the display panel 7 that is a touch panel.

Configuration of Imaging Device Next, the configuration of the imaging device 1 will be described (see FIGS. 3 to 15).

The imaging device 1 includes necessary components disposed inside and outside an outer case 8. The outer case 8 includes a cylindrical housing portion 9, a first rolling prevention portion 10, and a second rolling prevention portion 11.

The cylindrical housing portion 9 includes a cylindrical portion 12 formed to have a substantially cylindrical shape penetrating back and forth, an overhanging portion 13 overhanging inwardly from a front end part of the cylindrical portion 12, and a rear surface portion 14 closing the cylindrical portion 12 from behind. In the cylindrical portion 12, an external shape of a cross-section perpendicular to the front-rear direction that is an optical axis direction is formed to have a substantially circular shape.

The cylindrical portion 12 includes a large-diameter portion 12a positioned on the front side, a small-diameter portion 12b positioned on the rear side of the large-diameter portion 12a, and an inclined portion 12c positioned between the large-diameter portion 12a and the small-diameter portion 12b. The large-diameter portion 12a has a larger front-rear width than the small-diameter portion 12b, and the small-diameter portion 12b has a smaller diameter than the large-diameter portion 12a. The front end of the inclined portion 12c is matched with the rear end of the large-diameter portion 12a, and the rear end of the inclined portion 12c is matched with the front end of the small-diameter portion 12b, such that the diameter is inclined to be smaller while approaching from the large-diameter portion 12a to the small-diameter portion 12b.

Also, in the imaging device 1, the large-diameter portion 12a and the small-diameter portion 12b may be continuously provided without providing the inclined portion 12c.

The overhanging portion 13 is formed to have an annular shape. In the inside of the overhanging portion 13, an annular mount portion 15 is provided. The mount portion 15 protrudes forward from the overhanging portion 13 and thus includes engagement protrusion portions 15a, 15a, and 15a on the inner peripheral side (see FIG. 10). The engagement protrusion portions 15a, 15a, and 15a are provided to be spaced apart in a circumferential direction.

On the front surface of the mount portion 15, lock holes 15b and 15b opened forward are formed to be spaced apart in a circumferential direction. On the outer peripheral portion of the mount portion 15, a lock release button 15c is provided.

In the inside of the cylindrical housing portion 9, a rectangular light transmission hole 9a is formed at a position close to the front end. In the inside of the cylindrical housing portion 9, an image sensor 16 is disposed on the rear side of the light transmission hole 9a. In the imaging device 1, light captured through a lens group to be described below is photoelectrically converted by the image sensor 16.

The first rolling prevention portion 10 is provided to protrude outward at a position close to the left side of the lower surface side of the cylindrical portion 12 (see FIGS. 3 to 5). The outer surface of the first rolling prevention portion 10 includes a front surface 10a, a rear surface 10b, a side surface 10c, a continuous surface 10d, and a bottom surface 10e. The continuous surface 10d is a surface continuous to the side surface 10c and the bottom surface 10e therebetween and is formed obliquely downward to have a convex curved shape.

The first rolling prevention portion 10 has a function of preventing the imaging device 1 from rolling when the imaging device 1 is placed on a placement surface of a desk or a table, and the first rolling prevention portion 10 can prevent damage or malfunction due to the falling or the like of the imaging device 1. In particular, the imaging device 1 is configured such that the outer surface of the cylindrical portion 12 is a circumferential surface shape and the first rolling prevention portion 10 is useful to prevent damage or malfunction due to the falling or the like.

In the first rolling prevention portion 10, a cover body 17 is disposed (see FIGS. 3 and 8). The cover body 17 is positioned on the side surface 10c. In the imaging device 1, an external connection terminal, such as a universal serial bus (USB) (not shown), and a memory card slot are provided in the inside of the cover body 17. Therefore, by opening the cover body 17, the connection to an external device and the mounting of a memory card can be performed. Also, by the connection to the external device or the mounting of the memory card, an image or a video captured by the imaging device 1 can be recorded in the external device or the memory card.

The second rolling prevention portion 11 is provided to protrude outward at a position close to the right side of the lower surface side of the cylindrical portion 12 (see FIGS. 4 to 5). The outer surface of the second rolling prevention portion 11 includes a front surface 11a, a rear surface 11b, a side surface 11c, a continuous surface 11d, and a bottom surface 11e. The continuous surface 11d is a surface continuous to the side surface 11c and the bottom surface 11e therebetween and is formed obliquely downward to have a convex curved shape.

The second rolling prevention portion 11 has a function of preventing the imaging device 1 from rolling when the imaging device 1 is placed on a placement surface of a desk or a table, and the second rolling prevention portion 11 can prevent damage or malfunction due to the falling or the like of the imaging device 1. In particular, the imaging device 1 is configured such that the outer surface of the cylindrical portion 12 is a circumferential surface shape and the second rolling prevention portion 11 is useful to prevent damage or malfunction due to the falling or the like.

The second rolling prevention portion 11 has a larger outer shape than the first rolling prevention portion 10. Therefore, the first rolling prevention portion 10 is smaller than the second rolling prevention portion 11.

As described above, in the imaging device 1, the first rolling prevention portion 10 and the second rolling prevention portion 11 spaced apart horizontally are provided. The photographing can be performed even when either the first rolling prevention portion 10 or the second rolling prevention portion 11 is grasped. Therefore, it is possible to prevent the rolling of the imaging device 1 in both of the left and right directions due to the first rolling prevention portion 10 and the second rolling prevention portion 11, and it is possible to improve usability by ensuring the stable grasping state of the imaging device 1 even when either the first rolling prevention portion 10 or the second rolling prevention portion 11 is grasped during photographing.

In the first rolling prevention portion 10, the cover body 17 is disposed (see FIGS. 3 and 8). The cover body 17 is positioned on the side surface 11c. In the imaging device 1, an external connection terminal, such as a universal serial bus (USB) (not shown), and a memory card slot are provided in the inside of the cover body 17. Therefore, by opening the cover body 17, the connect ion to an external device and the mount ing of a memory card can be performed. Also, by the connection to the external device or the mounting of the memory card, an image or a video captured by the imaging device 1 can be recorded in the external device or the memory card.

In the rear surface portion 14 of the cylindrical housing portion 9, coupling protrusion portions 18 and 18 protruding rearward on an outer peripheral portion are provided to be spaced apart in a circumferential direction (see FIG. 5).

In the rear surface portion 14, a lock pin 19 is supported movably in a front-rear direction in the vicinity of the coupling protrusion portions 18. The lock pin 19 is biased backward by a spring (not shown).

In the small-diameter portion 12b of the cylindrical portion 12, a lock release lever 20 is disposed (see FIGS. 5 and 9). By operating the lock release lever 20, the lock pin 19 is drawn into the inside of the cylindrical housing portion 9.

In the imaging device 1, the coupling protrusion portions 18 and 18 are inserted into and coupled to coupling holes of the adapter 2, respectively. When the coupling protrusion portions 18 and 18 are inserted into and coupled to the coupling holes of the adapter 2, respectively, and the adapter 2 is rotated with respect to the imaging device 1 to a predetermined position in a circumferential direction of the base body 4, the lock pin 19 is moved rearward by a biasing force of the spring and is inserted into the locked hole of the adapter 2, and the adapter 2 is mounted in a state of being locked to the imaging device 1.

On the other hand, when the lock release lever 20 is operated, the lock pin 19 is moved forward against the biasing force and is drawn out from the locked hole, and the lock by the lock pin 19 is released with respect to the adapter 2. By rotating the adapter 2 to a predetermined position in a circumferential direction of the base body 4 with respect to the imaging device 1, the coupling protrusion portions 18 and 18 can be drawn out from the coupling holes of the adapter 2, and the adapter 2 can be detached from the imaging device 1.

In the rear surface portion 14 of the cylindrical housing portion 9, a battery cover 21 is disposed between the coupling protrusion port ions 18 and 18 (see FIG. 5). In the imaging device 1, a battery accommodation portion 22 is provided inside the battery cover 21 (see FIG. 11). By opening and closing the battery cover 21, the mounting and removal of a battery 23 can be performed with respect to the battery accommodation portion 22.

As an operation button, for example, a communication switch button 24 is disposed on the rear surface of the battery accommodation portion 22.

In this way, since the communication switch button 24 is disposed in the battery accommodation portion 22, the communication switch button 24 is not operated when the battery cover 21 is closed, and the erroneous operation of the communication switch button 24 can be prevented.

In the imaging device 1, a wireless communication (WiFi: Wireless Fidelity) is possible. As a wireless communication mode, there are a mono communication mode in which communication with one device is possible and a multi communication mode in which communication among a plurality of devices is possible. One of the modes can be selected and set.

The communication switch button 24 is a button for switching the above-described communication mode. Whenever the communication switch button 24 is operated, the mono communication mode, the multi communication mode, and the communication off mode are switched. Since the communication switch button 24 is a button for switching the modes of the wireless communication, the communication switch button 24 is a less frequently used button.

Since the communication switch button 24 that is less frequently used is provided as an operation button that can be used only when the battery cover 21 is opened, it is possible to prevent erroneous operation during the non-use of the communication switch button 24 that is less frequently used.

In the large-diameter portion 12a of the cylindrical portion 12, microphones 25 and 25 spaced apart horizontally are disposed at the upper end part (see FIGS. 3 and 6). The microphones 25 and 25 are parts for inputting an external sound. The large-diameter portion 12a of the cylindrical portion 12 is a part constituting the outer case 8 and is disposed in the outermost periphery of the imaging device 1. Thus, by disposing the microphones 25 and 25 in the large-diameter portion 12a, the external sound is hardly blocked and the sound quality of the input sound can be improved.

In the large-diameter portion 12a of the cylindrical portion 12, a shooting button 26 that functions as a shutter is provided on a left side part. The shooting button 26 is positioned above the first rolling prevention portion 10 (see FIGS. 3 and 8). When the shooting button 26 is operated, photographing a subject is performed.

In the imaging device 1, as shown in FIGS. 4 and 8, when an intersection line between a horizontal surface H including a center M of the outer case 8 in the vertical direction and an outer peripheral surface of the outer case 8 is set as a horizontal line Ha, the shooting button 26 is positioned close to the horizontal line Ha above the horizontal line Ha.

As described below, the first rolling prevention portion 10 is a part to be grasped during capturing. As described above, the shooting button 26 is positioned above the first rolling prevention portion 10. Accordingly, it is possible to perform photographing by operating the shooting button 26 by a hand grasping the first rolling prevention portion 10 during the photographing. In addition, it is possible to easily operate the shooting button 26 and improve usability of the imaging device 1.

Also, since the shooting button 26 is positioned close to the first rolling prevention portion 10 that has a smaller outer shape between the first rolling prevention portion 10 and the second rolling prevention portion 11, the movement of the finger is hardly disturbed by the first rolling prevention portion 10 and it is possible to ensure good operability with respect to the shooting button 26.

Also, for example, a function of performing autofocus by half-pressing and performing image capturing by fully-pressing may be added to the shooting button 26. For example, the imaging device 1 may be used in a state of not being attached to the display device 3, but the focusing operation is difficult because an image display unit does not exist in the imaging device 1. Therefore, if the autofocus is performed by half-pressing of the shooting button 26, it is possible to provide a user with an intuitively understandable operation.

Also, a sound output unit is provided in the imaging device 1. By outputting an electronic sound or the like from the sound output unit during the autofocus operation, the user recognizes that the operation has been performed, thus achieving the certainty of operation.

Furthermore, the shooting button 26 is disposed on the left side part of the large-diameter portion 12a, and the shooting button 26 is positioned to be spaced apart from the microphones 25 and 25 provided at the upper end part of the large-diameter portion 12a. Therefore, a sound when the user operates the shooting button 26 is hardly input to the microphones 25 and 25 and it is possible to suppress a reduction in sound quality.

In the large-diameter portion 12a of the cylindrical portion 12, a flash unit 27 is disposed at an upper end part (see FIGS. 12 and 13). The flash unit 27 includes a flash 27a functioning as a light-emitting unit, a cover portion 27b covering the flash 27a from above, and arm portions 27c and 27c supporting the flash 27a. Auxiliary light used at the time of night photographing is emitted from the flash 27a. The cover portion 27b is coupled to the upper surface of the flash 27a, the flash 27a is rotatably supported to one end of the arm portions 27c and 27c, and the other end of the arm portions 27c and 27c are rotatably supported to a support portion (not shown) provided in the inside of the cylindrical housing portion 9.

In the flash unit 27, the arm portions 27c and 27c are rotated with respect to the flash 27a and the support portion, and thus, the flash 27a and the arm portions 27c and 27c are movable between an accommodation position where the flash 27a and the arm portions 27c and 27c are accommodated in a unit accommodation concave portion 12d and a protrusion position where the flash 27a and the arm portions 27c and 27c protrude upward from the unit accommodation concave portion 12d. The flash unit 27 is biased in a direction of moving from the accommodation position to the protrusion position by a biasing spring (not shown).

In a state in which the flash 27a and the arm portions 27c and 27c are at the accommodation position, the unit accommodation concave portion 12d is closed by the cover portion 27b. At this time, the flash unit 27 is locked by a lock mechanism (not shown) provided in the inside of the cylindrical portion 12, and unintended jumping-out of the flash 27a and the arm portions 27c and 27c from the unit accommodation concave portion 12d to the protrusion position is restricted.

As described above, the flash unit 27 can be accommodated in the unit accommodation concave portion 12d formed in the large-diameter portion 12a, and the large-diameter portion 12a is provided on the front side rather than the small-diameter portion 12b, the front side being a subject side. Therefore, the auxiliary light emitted from the flash 27a moved to the protrusion position hardly arrives at the large-diameter portion 12a and it is possible to prevent shielding or reflection of the auxiliary light in the large-diameter portion 12a.

In the small-diameter portion 12b of the cylindrical portion 12, a power button 28 performing power on and off of the imaging device 1 is disposed at the upper end part (see FIGS. 3 and 6). The power button 28 is disposed such that the surface does not protrude outward from the outer periphery of the small-diameter portion 12b at a front end part of the small-diameter portion 12b. Since the power button 28 does not protrude outward from the outer periphery of the small-diameter portion 12b, the erroneous operation of the power button 28 is prevented.

Also, since the power button 28 is disposed in the small-diameter portion 12b having a smaller diameter than the large-diameter portion 12a, an erroneous operation is hardly performed and it is possible to prevent an erroneous operation to be performed on the power button 28. In particular, the imaging device 1 is a portable device. For example, when the imaging device 1 is carried in a bag or the like, the large-diameter portion 12a easily contacts a part of the bag or other goods accommodated in the bag, and the small-diameter portion 12b hardly contacts a part of the bag or other goods accommodated in the bag. Accordingly, the power button 28 is hardly operated unintentionally and it is possible to prevent the erroneous operation to be performed on the power button 28.

Furthermore, since the power button 28 is disposed at the end of the inclined portion 12c side that is the front end part of the small-diameter portion 12b, as shown in FIG. 14, the power button 28 can be operated by putting an index finger 101 or a middle finger 102 of a right hand 100 on the inclined portion 12c and sliding the index finger 101 or the middle finger 102 from the inclined portion 12c to the small-diameter portion 12b. Therefore, it is possible to improve the operability with respect to the power button 28.

In the small-diameter portion 12b of the cylindrical portion 12, a pop-up button 29 moving the flash unit 27 from the accommodation position to the protrusion position is disposed in a portion close to the upper portion (see FIGS. 3 and 6). The pop-up button 29 is disposed such that the surface does not protrude outward from the outer periphery of the small-diameter portion 12b at the front end part of the small-diameter portion 12b. Since the pop-up button 29 does not protrude outward from the outer periphery of the small-diameter portion 12b, the erroneous operation of the pop-up button 29 is prevented.

The pop-up button 29 is disposed to be spaced apart with respect to the power button 28 at a position close to the power button 28 in a circumferential direction.

Since the pop-up button 29 is disposed in the small-diameter portion 12b having a smaller diameter than the large-diameter portion 12a, an erroneous operation is hardly performed and it is possible to prevent an erroneous operation to be performed on the pop-up button 29. In particular, the imaging device 1 is a portable device. For example, when the imaging device 1 is carried in a bag or the like, the large-diameter portion 12a easily contacts a part of the bag or other goods accommodated in the bag, and the small-diameter portion 12b hardly contacts a part of the bag or other goods accommodated in the bag. Accordingly, the pop-up button 29 is hardly operated unintentionally and it is possible to prevent an erroneous operation to be performed on the pop-up button 29.

Also, since the pop-up button 29 is disposed at the end of the inclined portion 12c side that is the front end part of the small-diameter portion 12b, as shown in FIG. 14, for example, the pop-up button 29 can be operated by putting an index finger 101 or a middle finger 102 of a right hand 100 on the inclined portion 12c and sliding the index finger 101 or the middle finger 102 from the inclined portion 12c to the small-diameter portion 12b. Therefore, it is possible to improve the operability with respect to the pop-up button 29.

Furthermore, since the power button 28 and the shooting button 26 are positioned to be spaced apart at the upper portion and the side portion in the circumferential direction of the imaging device 1, an erroneous operation hardly occurs between the power on and off operation and the photographing operation.

Similarly, since the pop-up button 29 and the shooting button 26 are positioned to be spaced apart at the upper portion and the side portion in the circumferential direction of the imaging device 1, an erroneous operation hardly occurs between the operation of moving the flash unit 27 to the protrusion position and the photographing operation.

In the large-diameter portion 12a of the cylindrical portion 12, a hole 30 for a tripod is formed at a lower end part (see FIG. 7). The hole 30 for the tripod is a hole for connecting the imaging device 1 to the tripod (not shown) at the time of photographing or the like.

In the small-diameter portion 12b of the cylindrical portion 12, a display unit 31 such as a liquid crystal panel is disposed at a right end part. The remaining amount of the battery 23 or the insertion or non-insertion of the memory card into the memory card slot is displayed on the display unit 31. Also, when the mono communication mode or the multi communication mode is set by the operation performed on the communication switch button 24, each of such displays is displayed on the display unit 31. When the communication off mode is set, the mono communication mode or the multi communication mode displayed on the display unit 31 is hidden.

Since the display unit 31 is disposed, the remaining amount of the battery 23, the insertion or non-insertion of the memory card into the memory card slot, or the setting state of the communication mode can be checked from the outside of the imaging device 1, thus improving the usability of the imaging device 1.

In the large-diameter portion 12a of the cylindrical portion 12, a light-emitting display unit 32 exhibiting a display function by light emission is disposed at an upper end part. The light-emitting display unit 32 is disposed at a rear end part of the large-diameter portion 12a and is positioned in a rear side of the cover portion 27b of the flash unit 27. For example, the light-emitting display unit 32 emits light with predetermined colors when the imaging device 1 is in on-state by the operation of the power button 28 or during photographing.

Since the light-emitting display unit 32 is disposed in the large-diameter portion 12a that is the outermost periphery of the imaging device 1, the light emitted from the light-emitting display unit 32 is not shielded and it is possible to ensure good display performance of the light-emitting display unit 32.

In the imaging device 1, a wireless communication function is provided. The use of the wireless communication makes it possible to perform various operations, for example, an operation of displaying or storing an image or a video captured by the imaging device 1 on/in the display device 3, an operation of executing a photographing function of the imaging device 1 by the operation performed on the display device 3, and an operation of executing a zoom function of the imaging device 1 by the operation performed on the display device 3.

Specifically, for example, a near field communication (NFC) unit (NFC tag) 33 performing an NFC is mounted in inside at a position close to the upper end of the large-diameter portion 12a of the cylindrical portion 12. The imaging device 1 performs non-contact communication between the NFC communication unit 33 and an NFC communication unit (not shown) mounted on the display device 3. The NFC communication unit 33 is positioned on the right side of the flash unit 27 in the vicinity of the flash unit 27.

When the non-contact communication is performed, the display device 3 is positioned close to the NFC communication unit 33 of the imaging device 1 from above (see FIG. 15). At this time, the user grasps the display device 3 with the right hand 100 and positions the display device 3 at a position close to the NFC communication unit 33 from the diagonally right upper side such that the display device 3 faces the imaging device 1.

Therefore, as described above, since the NFC communication unit 33 is positioned on the right side of the flash unit 27 at the position close to the upper end of the large-diameter portion 12a, the non-contact communication can be easily and reliably performed.

Also, since the NFC communication unit 33 is disposed on the upper side in the inside of the cylindrical portion 12, in a case where the tripod is attached to the hole 30 for the tripod and the imaging device 1 is used, the display device 3 easily approaches the NFC communication unit 33 and it is advantageous to the non-contact communication.

Furthermore, the imaging device 1 may be used in a state of being placed on a placement surface of a desk or a table, but in such a use state, it is usual that the user approaches the display device 3 to the imaging device 1 from above. Therefore, since the NFC communication unit 33 is disposed on the upper side in the inside of the cylindrical portion 12, the arrangement is suitable for the near field communication even in such a use state.

Also, the arrangement position of the NFC communication unit 33 may be other than the upper side in the inside of the cylindrical portion 12, but it is desirable that the NFC communication unit 33 is not disposed at a position close to the rear surface portion 14 of the cylindrical housing portion 9. In a case where the NFC communication unit 33 performing the near field communication is disposed close to the rear surface portion 14 side, as shown in FIGS. 1 and 2, when the imaging device 1 is used while being mounted on the display device 3 by the adapter 2, the NFC communication unit 33 of the imaging device 1 is in a state of being always close to the NFC communication unit of the display device 3, and the polling may be always performed.

In the imaging device 1, for example, WiFi (Wireless Fidelity) communication unit (not shown) is provided for transmission or the like of the captured image, and wireless communication is performed with the WiFi communication unit mounted on the display device 3.

In addition to be powered on by the operation performed on the power button 28, the imaging device 1 may be powered on by the NFC communication from the display device 3 side. For example, the imaging device 1 is powered on when the NFC communication is established. Also, in the imaging device 1, since the NFC communication function is displayed in the vicinity of the power button 28 of the upper end part or the like of the cylindrical portion 12, the user easily checks whether or not the power on operation is performed and the usability of the imaging device 1 can be improved.

Configuration of Interchangeable Lens

Next, the configuration of the interchangeable lens 34 detachably attached to the imaging device 1 will be described (see FIGS. 3 to 10).

The interchangeable lens 34 includes necessary components disposed inside and outside an outer cylindrical portion 35. The outer cylindrical portion 35 is formed to have a substantially cylindrical shape, and an outer diameter of the outer cylindrical portion 35 is slightly smaller than an outer diameter of the large-diameter portion 12a of the imaging device 1. At the rear end part of the outer cylindrical portion 35, a plurality of engagement portions (not shown) and lock pins protruding rearward are provided to be spaced apart from each other in a circumferential direction.

For example, the interchangeable lens 34 is detachably attached to the imaging device by a bayonet method, and the engagement portions are respectively inserted between the engagement protrusion portions 15a, 15a, and 15a provided in the mount portion 15 and are rotated by a predetermined angle so that the engagement portions are respectively engaged with the engagement protrusion portions 15a, 15a, and 15a and coupled to the imaging device 1.

In a state in which the interchangeable lens 34 is coupled to the imaging device 1, the lock pins are respectively inserted into the lock holes 15b and 15b of the mount portion 15 and the interchangeable lens 34 is locked to the imaging device 1.

When the lock release button 15c provided in the mount portion 15 of the imaging device 1 is operated, the lock pins are respectively drawn out from the lock holes 15b and 15b and the lock of the interchangeable lens 34 to the imaging device 1 is released. Therefore, in a state in which the lock of the interchangeable lens 34 to the imaging device 1 is released, the coupling of the interchangeable lens 34 to the imaging device 1 is released by rotating the interchangeable lens 34 in a direction opposite to the coupling to the imaging device 1.

A zoom knob 36 for performing zooming is disposed at a position over a lower surface from a left-side portion of the outer cylindrical portion 35 (see FIGS. 3 and 8). A zoom between telephoto and wide angle is performed by operating the zoom knob 36.

For example, the zoom knob 36 is operated by moving in a vertical direction (circumferential direction). Since the zooming is performed by the operation of moving the zoom knob 36 in a predetermined direction, good operability can be ensured and the usability of the imaging device 1 can be improved.

Also, the zoom knob 36 may be configured such that the zoom knob 36 is operated by movement in a horizontal direction or an oblique direction.

In a state in which the interchangeable lens 34 is coupled to the imaging device 1, the zoom knob 36 of the interchangeable lens 34 and the shooting button 26 of the imaging device 1 are positioned close to each other in a front-rear direction. Since the zoom knob 36 and the shooting button 26 are positioned close to each other, the user can easily perform a series of capturing operations in which a photographing operation is performed after performing a view angle adjustment by the zooming operation, and the usability of the imaging device 1 can be improved.

Also, as described above, the shooting button 26 is positioned close to the horizontal line Ha above the horizontal line Ha, and the zoom knob 36 is positioned on the same side as the shooting button 26, that is, the left side, in the horizontal direction.

In the inside of the outer cylindrical portion 35, an inner cylindrical portion 37 that is movable in the front-rear direction is supported (see FIGS. 3 and 11). The imaging device 1 becomes a photographing state when the inner cylindrical portion 37 is drawn forward with respect to the outer cylindrical portion 35 (see FIG. 16), and becomes a retracted state when the inner cylindrical portion 37 drawn forward is retracted rearward and accommodated in the inside of the outer cylindrical portion 35 (see FIG. 3).

At the front end part of the outer cylindrical portion 35, an operation ring 38 is rotatably supported. Focusing or zooming (manual zooming) can be performed by rotating the operation ring 38. On the outer peripheral surface of the operation ring 38, a plurality of concave-convex portions is formed, and it is possible to prevent a finger from being slipped during operations and to improve operability.

A photographic lens 39 is mounted on the front end part of the inner cylindrical portion 37. In the inside of the inner cylindrical portion 37, a plurality of lens groups including the photographic lens 39 positioned at the most front side in the front-rear direction (optical axis direction), is disposed, and light captured through the lens groups is photoelectrically converted in the image sensor 16.

As described above, since the interchangeable lens 34 including the photographic lens 39 is detachably attached to the imaging device 1, photographic magnification can be changed by attaching the interchangeable lens 34 and the functionality of the imaging device 1 can be improved.

Use Mode of Imaging Device

Next, the use mode of the imaging device 1 will be described (see FIGS. 17 to 19).

As described above, the adapter 2 attached to the imaging device 1 is attached to the display device 3, and the imaging device 1 is attached to the display device 3 through the adapter 2. In such a state that the imaging device 1 is attached to the display device 3 through the adapter 2, the photographing or the like can be performed using the imaging device 1.

At this time, for example, a photographer grasps the display device 3 with a right hand 100 and grasps the imaging device 1 with a left hand 200 (see FIG. 17). For example, the imaging device 1 is grasped with the left hand 200 so as to be lifted from the lower side, a palm 200a is put at a position over the left side surface from the lower surface of the cylindrical housing portion 9, a thumb 202 is put on the side surface 10c of the first rolling prevention portion 10, and an index finger 201 and a middle finger 203 are put at a position over the right side surface from the lower surface of the cylindrical portion 12.

Since the first rolling prevention portion 10 is provided in the imaging device 1, the palm 200a is put on the first rolling prevention portion 10 and good grasping property with respect to the imaging device 1 can be ensured.

In the imaging device 1, as described above, since the shooting button 26 is disposed above the first rolling prevention portion 10, and the zoom knob 36 and the shooting button 26 are positioned close to each other in the front-rear direction, the thumb 202 of the left hand 200 is naturally put on the zoom knob 36 and the shooting button 26 when the imaging device 1 is grasped with the left hand 200.

Therefore, when the imaging device 1 is grasped, the finger is naturally put on the first rolling prevention portion 10 protruding from the cylindrical housing portion 9, and it is possible to ensure good operability with respect to the zoom knob 36 and the shooting button 26 while ensuring good grasping property with respect to the imaging device 1.

Also, since the shooting button 26 is disposed above the first rolling prevention portion 10, the shooting button 26 can be easily pressed by horizontally moving the finger put on the first rolling prevention portion 10 protruding from the cylindrical housing portion 9 and it is possible to ensure high operability with respect to the shooting button 26.

Furthermore, since the zoom knob 36 is positioned close to the shooting button 26, the zoom knob 36 can be easily operated by moving the finger put on the first rolling prevention portion 10 protruding from the cylindrical housing portion 9 and it is possible to ensure high operability with respect to the zoom knob 36.

Furthermore, the zoom knob 36 is operated by the vertical movement, and the finger can be easily moved in the vertical direction in a state of being put on the first rolling prevention portion 10. Therefore, since the zoom knob 36 is operated by the vertical movement, it is possible to ensure higher operability with respect to the zoom knob 36.

In the above, the use mode in which the imaging device 1 is attached to the display device 3 through the adapter 2 has been described as an example, but the imaging device 1 can also be used in a state of not being attached to the display device 3 (see FIG. 18). In this case, the setting is performed such that an image acquired by the imaging device 1 is displayed on the display panel 7 of the display device 3 by approaching the NFC communication unit mounted on the display device 3 to the NFC communication unit 33 provided in the imaging device 1, and the capturing of the image or video acquired by the imaging device 1 can be performed by operating a predetermined operation unit of the display panel 7 (touch panel) while checking the image displayed on the display panel 7.

At this time, a desired image may be acquired by grasping the imaging device 1 with the hand not grasping the display device 3, for example, the left hand 200, and an image may also be acquired when the imaging device 1 is in a stationary state. In the use mode of such a stationary state, the rolling of the imaging device 1 with respect to the placement surface of the desk or the table can be prevented by the first rolling prevention portion 10 and the second rolling prevention portion 11 and it is possible to ensure the stable placement state of the imaging device 1 and improve the image quality of the acquired image.

Also, in a state in which the imaging device 1 is attached to the display device 3 through the adapter 2, the photographing or the like can be performed in a stationary state in which the imaging device 1 is placed on the placement surface 300 of the desk or the table (see FIG. 19). In the use mode of such a stationary state, since the imaging device 1 and the display device 3 are placed on the placement surface 300 at positions spaced apart in the front-rear direction and the mounted bodies 5 of the adapter 2 attached to the display device 3 are placed on the placement surface 300, it is possible to ensure the stable placement state of the imaging device 1 and improve the image quality of the acquired image.

Also, both operations of capturing the image or the video in the carrying state (grasping state) of the imaging device 1 and the stationary state are similar to each other, the imaging device 1 and the display device 3 communicate with each other by wireless, and the image or the video captured by the imaging device 1 is displayed on the display panel 7 of the display device 3. A photographer can check a screen displayed on the display panel 7 and capture the image or video acquired by the imaging device 1 by operating the shooting button 26 of the imaging device 1 or operating a predetermined operation unit of the display panel 7 that is the touch panel.

Embodiment of Imaging Device

The following shows a block diagram of an imaging device according to an embodiment of the present technology (see FIG. 20).

The imaging device 1 includes an image sensor 52 configured to photoelectrically convert light captured through a lens groups 51 of an interchangeable lens 34, a camera signal processing unit 53 configured to perform signal processing such as analog-to-digital conversion of a captured image signal, and an image processing unit 54 configured to perform recording and reproduction processing of the image signal. Also, the imaging device 1 includes a reader/writer (R/W) 55 configured to write and read the image signal to/from a memory card 400, a central processing unit (CPU) 56 configured to control the entire imaging device 1, input operation units 57, 57, . . . (zoom knob 36, shooting button 26, etc.) such as various switches configured to allow a user to perform necessary operations, and a communication unit 58.

The camera signal processing unit 53 performs a variety of signal processing, such as conversion of a signal output from the image sensor 52 into a digital signal, noise removal, image quality correction, or conversion into luminance and color difference signals.

The image processing unit 54 performs compression encoding and expansion decoding processing of the image signal, based on a predetermined image data format, or conversion processing of data specifications such as a resolution.

The R/W 55 writes an image data encoded by the image processing unit 54 to the memory card 400 and read the image data recorded in the memory card 400.

The CPU 56 functions as a control processing unit configured to control the respective units provided in the imaging device 1 and controls the respective units based on an instruction input signal from the input operation units 57, 57, . . . .

Also, the CPU 56 can transmit and receive various data or control information to/from the display device 3 through the wireless communication by the communication unit 58 including the NFC communication unit 33 or the WiFi communication unit. Specifically, when the non-contact communication such as NFC communication is performed between the imaging device 1 and the display device 3, the imaging device 1 is powered on and an application for operating the imaging device 1 is started in the display device 3. Also, the setting is performed to enable the WiFi communication between the imaging device 1 and the display device 3, and various data or control information can be transmitted and received to/from the display device 3.

The input operation units 57, 57, . . . output the instruction input signal corresponding to the operation of the user to the CPU 56.

The memory card 400 is, for example, a semiconductor memory that can be detachably attached to the memory card slot connected to the R/W 55.

In the following, the operation of the imaging device 1 will be described.

When the photographing operation is performed by the instruction input signal from the input operation units 57, 57, . . . , the captured image signal is output from the camera signal processing unit 53 to the image processing unit 54, undergoes compression encoding processing, and is converted into digital data of a predetermined data format. The converted data is output to the R/W 55 and is written to the memory card 400. Also, the converted data is transferred to the display device 3 by the wireless communication and is output to the display panel 7, or may be written to a storage unit of the display device 3.

In a case where the image data recorded in the memory card 400 is reproduced, the predetermined image data is read from the memory card 400 by the R/W 55 according to the operation performed on the input operation unit 57, 57, . . . . After the expansion decoding processing is performed on the read predetermined image data by the image processing unit 54, a reproduction image signal is transferred to the display device 3 by the wireless communication and is output to the display panel 7. Thus, the reproduction image is displayed on the display panel 7.

Conclusion

As described above, the imaging device 1 includes the image sensor 16 and the outer case 8 in which the image sensor 16 is disposed inside. The large-diameter portion 12a and the small-diameter portion 12b having a smaller outer diameter than an outer diameter of the large-diameter portion 12a are provided in the outer case 8, the large-diameter portion 12a and the small-diameter portion 12b being spaced apart or continuous in the optical axis direction. The shooting button 26 performing the photographing of the subject is disposed on the outer peripheral surface of the large-diameter portion 12a.

Therefore, since the photographing of the subject is performed by the operation performed on the shooting button 26 disposed in the large-diameter portion 12a, it is possible to ensure good operability with respect to the shooting button 26 and improve the usability of the imaging device 1.

Also, since the large-diameter portion 12a is provided closer to the subject side (front side) than the small-diameter portion 12b, the diameter of the subject side becomes large in the outer case 8 so that the user can easily grasp the imaging device 1, and the usability of the imaging device 1 can be improved.

Furthermore, when the intersection line between the horizontal surface H including the center M of the outer case 8 in the vertical direction and the outer peripheral surface of the outer case 8 is set as the horizontal line Ha, the shooting button 26 is positioned close to the horizontal line Ha above the horizontal line Ha, and the zoom knob 36 is positioned on the same side as the shooting button 26 in the horizontal direction.

Therefore, in a state in which the imaging device 1 is grasped, the photographing of the subject is performed by operating the shooting button 26 positioned close to the horizontal line Ha above the horizontal line Ha, and the shooting button 26 and the zoom knob 36 can be simultaneously or individually operated with the finger of the same hand. It is possible to ensure good operability with respect to the shooting button 26 and the zoom knob 36 and improve the usability of the imaging device 1.

Others

In the above, the example in which the interchangeable lens 34 is detachably attached to the imaging device 1 has been described, but, for example, the entirety of the both may be configured as an imaging device 1A (see FIG. 21). In this case, a part corresponding to the imaging device 1 is configured as a device body 40, and the imaging device 1A includes the device body 40 and an interchangeable lens 34 that is detachably attached to the device body 40.

Even in the imaging device 1A including the device body 40 and the interchangeable lens 34, since the photographing of the subject is performed by the operation performed on the shooting button 26 disposed in the large-diameter portion 12a, it is possible to ensure good operability with respect to the shooting button 26 and improve the usability of the imaging device 1A.

Also, since the interchangeable lens 34 including the photographic lens 39 is detachably attached to the device body 40 of the imaging device 1A, photographic magnification can be changed by attaching the interchangeable lens 34 and the functionality of the imaging device 1A can be improved.

Furthermore, in the imaging device 1A, since the finger easily moves in a vertical direction in a grasped state, the zoom knob 36 is disposed in the interchangeable lens 34 and the zoom knob 36 is operated by the vertical movement. Therefore, the operating direction of the zoom knob 36 and the easily moving direction of the finger are matched with each other and it is possible to ensure high operability with respect to the zoom knob 36.

Also, in the imaging device 1A, the device body 40 and the interchangeable lens 34 may be integrally formed (see FIG. 22). In this case, it is unnecessary to provide the part corresponding to the mount portion 15 and it is possible to achieve miniaturization as much in the optical axis direction.

Also, in the imaging device 1A in which the interchangeable lens 34 is integrally provided, it is unnecessary to detach and attach the interchangeable lens 34 and it is possible to improve the usability of the imaging device 1A, change the photographic magnification by the interchangeable lens 34 that is integrally provided, and improve the functionality.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An imaging device including:

an image sensor; and an outer case in which the image sensor is disposed, wherein a shooting button configured to photograph a subject is disposed on an outer peripheral surface of the outer case, wherein, when an intersection line between a horizontal surface including a center of the outer case in a vertical direction and the outer peripheral surface of the outer case is set as a horizontal line, the shooting button is positioned close to the horizontal line above the horizontal line, and wherein a zoom knob configured to change photographic magnification is positioned on a same side as the shooting button in a horizontal direction.

(2)

The imaging device according to (1), wherein a large-diameter portion and a small-diameter portion having a smaller outer diameter than an outer diameter of the large-diameter portion are provided in the outer case, the large-diameter portion and the small-diameter portion being spaced apart or continuous in an optical axis direction of light incident on the image sensor, and wherein the large-diameter portion is provided closer to a subject side than the small-diameter portion.

(3)

The imaging device according to (2), wherein a power button configured to perform power on and off is disposed in the small-diameter portion.

(4)

The imaging device according to (3), wherein an inclined portion is provided between the large-diameter portion and the small-diameter portion, the inclined portion being inclined in a manner that the inclined portion has a smaller diameter from the large-diameter portion to the small-diameter portion, and wherein the power button is disposed at an end part of an inclined portion side in the small-diameter portion.

(5)

The imaging device according to any one of (2) to (4), wherein a flash unit which includes a flash configured to emit auxiliary light is provided, the flash unit being moved between an accommodation position where the flash unit is accommodated inside the outer case and a protrusion position where the flash unit protrudes outward from the outer case, and wherein a pop-up button is disposed in the small-diameter portion so as to move the flash unit from the accommodation position to the protrusion position.

(6)

The imaging device according to (5), wherein an inclined portion is provided between the large-diameter portion and the small-diameter portion, the inclined portion being inclined in a manner that the inclined portion has a smaller diameter from the large-diameter portion to the small-diameter portion, and wherein the pop-up button is disposed at an end part of an inclined portion side in the small-diameter portion.

(7)

The imaging device according to (5) or (6), wherein the flash is accommodated in the large-diameter portion, and wherein the large-diameter portion is provided closer to a subject side than the small-diameter portion.

(8)

The imaging device according to any one of (1) to (7), wherein a battery accommodation portion configured to accommodate a battery is provided inside the outer case, wherein a battery cover configured to open and close the battery accommodation portion is supported by the outer case, and wherein an operation button is disposed in the battery accommodation portion.

(9)

The imaging device according to (8), wherein a communication switch button configured to switch a communication state with another device is provided as the operation button.

(10)

The imaging device according to any one of (2) to (7), wherein a microphone is disposed in the large-diameter portion.

(11)

The imaging device according to any one of (2) to (7) and (10), wherein a cylindrical housing portion which includes the large-diameter portion and the small-diameter portion, and a rolling prevention portion which protrudes outside the cylindrical housing portion in a direction perpendicular to an optical axis direction are provided in the outer case, wherein the rolling prevention portion is provided on a lower surface side of the cylindrical housing portion, and wherein the shooting button is positioned on an upper side above the rolling prevention portion.

(12)

The imaging device according to (11), wherein the two rolling prevention portions are spaced apart horizontally and provided.

(13)

The imaging device according to (12), wherein a first rolling prevention portion and a second rolling prevention portion having a larger outer shape than an outer shape of the first rolling prevention portion are provided as the two rolling prevention portions, and wherein the shooting button is provided closer to the first rolling prevention portion than the second rolling prevention portion.

(14)

The imaging device according to any one of (2) to (7) and (10) to (13), wherein a light-emitting display unit configured to exhibit a display function by light emission is disposed in the large-diameter portion.

(15)

The imaging device according to any one of (1) to (14), wherein an interchangeable lens including a photographic lens is detachable.

(16)

The imaging device according to any one of (1) to (14), wherein an interchangeable lens including a photographic lens is integrally provided.

(17)

An imaging device including:

an interchangeable lens which includes a photographic lens and in which a zoom knob configured to change photographic magnification is disposed on an outer peripheral surface; and a device body which includes an image sensor and an outer case in which the image sensor is disposed, wherein a shooting button configured to photograph a subject is disposed on the outer peripheral surface of the outer case, wherein, when an intersection line between a horizontal surface including a center of the outer case in a vertical direction and the outer peripheral surface of the outer case is set as a horizontal line, the shooting button is positioned close to the horizontal line above the horizontal line, and wherein the zoom knob is positioned on a same side as the shooting button in a horizontal direction.

(18)

The imaging device according to (17), wherein the interchangeable lens is detachably attached to the device body.

(19)

The imaging device according to (17), wherein the interchangeable lens and the device body are integrally provided.

(20)

The imaging device according to (18) or (19), wherein a zoom knob is disposed on the interchangeable lens, and wherein the zoom knob is operated by vertical movement.

REFERENCE SIGNS LIST 1 imaging device
8 outer case
9 cylindrical housing portion
10 rolling prevention portion
11 rolling prevention portion
12a large-diameter portion
12b small-diameter portion
12c inclined portion
16 image sensor
22 battery accommodation portion
23 battery
24 communication switch button
25 microphone
26 shooting button
27 flash unit
27a flash
28 power button
29 pop-up button
32 light-emitting display unit
34 interchangeable lens
36 zoom knob
39 photographic lens
1A imaging device
40 device body
1B imaging device
52 image sensor

The invention claimed is:

1. An imaging device, comprising:
an image sensor;
an outer case, wherein the image sensor is included in the outer case;

a shooting button configured to photograph a subject, wherein the shooting button is on an outer peripheral surface of the outer case;
a large-diameter portion;
a small-diameter portion, wherein
the outer case includes the large-diameter portion and the small-diameter portion,
an outer diameter of the small-diameter portion is smaller than an outer diameter of the large-diameter portion,
the small-diameter portion is in a rear side of the large-diameter portion, and
the large-diameter portion and the small-diameter portion are one of spaced apart in an optical axis direction of light incident on the image sensor or continuous in the optical axis direction; and
a zoom knob on a same side as the shooting button in a horizontal direction,
wherein the zoom knob is configured to change photographic magnification, and
the shooting button is separated from the zoom knob in the optical axis direction of the imaging device.

2. The imaging device according to claim 1, wherein the large-diameter portion is closer to a subject side than the small-diameter portion.

3. The imaging device according to claim 1, further comprising a power button configured to execute one of power on function or power off function,
wherein the power button is on the small-diameter portion.

4. The imaging device according to claim 3,
further comprising an inclined portion between the large-diameter portion and the small-diameter portion, wherein the inclined portion is inclined in a manner that the inclined portion has a smaller diameter from the large-diameter portion to the small-diameter portion, and
the power button is at an end part of a side of the inclined portion toward the small-diameter portion.

5. The imaging device according to claim 1, further comprising:
a flash unit that includes a flash configured to emit auxiliary light,
wherein the flash unit is configured to move between an accommodation position and a protrusion position,
the accommodation position corresponds to the flash unit accommodated inside the outer case, and the protrusion position corresponds to the flash unit protruded outward from the outer case; and
a pop-up button on the small-diameter portion, wherein the pop-up button is configured to move the flash unit from the accommodation position to the protrusion position.

6. The imaging device according to claim 5,
further comprising an inclined portion between the large-diameter portion and the small-diameter portion, wherein the inclined portion is inclined in a manner that the inclined portion has a smaller diameter from the large-diameter portion to the small-diameter portion, and
the pop-up button is at an end part of a side of the inclined portion toward the small-diameter portion.

7. The imaging device according to claim 5,
wherein the flash is accommodated in the large-diameter portion.

8. The imaging device according to claim 1, further comprising:

a battery accommodation portion configured to accommodate a battery, wherein the battery accommodation portion is inside the outer case;
a battery cover configured to one of open the battery accommodation portion or close the battery accommodation portion, wherein the battery cover is supported by the outer case; and
an operation button on the battery accommodation portion.

9. The imaging device according to claim 8,
wherein the operation button is a communication switch button, and
the communication switch button is configured to switch a communication state with an external device.

10. The imaging device according to claim 1, further comprising a microphone in the large-diameter portion.

11. The imaging device according to claim 1, wherein the outer case includes a cylindrical housing portion that includes the large-diameter portion, the small-diameter portion, a first rolling prevention portion, and a second rolling prevention portion,
at least one of the first rolling prevention portion or the second rolling prevention portion protrudes outside the cylindrical housing portion in a direction perpendicular to the optical axis direction,
at least one of the first rolling prevention portion or the second rolling prevention portion is on a lower surface side of the cylindrical housing portion, and
the shooting button is on an upper side above the first rolling prevention portion.

12. The imaging device according to claim 11,
wherein the first rolling prevention portion and the second rolling prevention portion are spaced apart horizontally.

13. The imaging device according to claim 12,
wherein the second rolling prevention portion has a first outer shape that is larger than a second outer shape of the first rolling prevention portion, and
the shooting button is closer to the first rolling prevention portion than the second rolling prevention portion.

14. The imaging device according to claim 1, further comprising a light-emitting display unit in the large-diameter portion, wherein the light-emitting display unit is configured to exhibit a display function by light emission.

15. The imaging device according to claim 1,
further comprising an interchangeable lens that includes a photographic lens, wherein the interchangeable lens is detachable from the outer case.

16. The imaging device according to claim 1,
further comprising an interchangeable lens including a photographic lens, wherein the photographic lens is integral with the imaging device.

17. An imaging device, comprising:
an interchangeable lens that includes a photographic lens and a zoom knob, wherein the zoom knob is configured to change photographic magnification, and the zoom knob is on a first outer peripheral surface of the interchangeable lens;
a device body includes an image sensor and an outer case, wherein the image sensor is in the outer case,
the outer case includes a large-diameter portion and a small-diameter portion,
an outer diameter of the small-diameter portion is smaller than an outer diameter of the large-diameter portion,
the small-diameter portion is in rear side of the large-diameter portion, and the large-diameter portion and the small-diameter portion are one of spaced apart in an optical axis direction of light incident on the image sensor or continuous in the optical axis direction; and a shooting button configured to photograph a subject, wherein the shooting button is on a second outer peripheral surface of the outer case, the zoom knob is on a same side as the shooting button in a horizontal direction, and the shooting button is separated from the zoom knob in the optical axis direction of the imaging device.

18. The imaging device according to claim 17, wherein the interchangeable lens is detachably attached to the device body.

19. The imaging device according to claim 17, wherein the interchangeable lens is integral with the device body.

20. The imaging device according to claim 17, wherein the zoom knob is operated by vertical movement.

* * * * *